United States Patent
Nasser-Ghodsi et al.

(10) Patent No.: US 9,679,372 B2
(45) Date of Patent: *Jun. 13, 2017

(54) APPARATUS AND METHODS FOR INSPECTING EXTREME ULTRA VIOLET RETICLES

(71) Applicant: KLA-Tencor Corporation, Milpitas, CA (US)

(72) Inventors: Mehran Nasser-Ghodsi, Hamilton, MA (US); Stanley E. Stokowski, Danville, CA (US); Mehdi Vaez-Iravani, Los Gatos, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/591,181

(22) Filed: Jan. 7, 2015

(65) Prior Publication Data

US 2015/0117754 A1 Apr. 30, 2015

Related U.S. Application Data

(63) Continuation of application No. 13/905,448, filed on May 30, 2013, now Pat. No. 8,953,869.

(Continued)

(51) Int. Cl.
*G06K 9/00* (2006.01)
*G06T 7/00* (2017.01)

(52) U.S. Cl.
CPC .... *G06T 7/001* (2013.01); *G06T 2207/10061* (2013.01); *G06T 2207/30148* (2013.01)

(58) Field of Classification Search
CPC combination set(s) only.
See application file for complete search history.

(56) References Cited

U.S. PATENT DOCUMENTS 6,235,434 B1 5/2001 Sweeney et al.
6,873,720 B2 * 3/2005 Cai et al. ............... 382/149

(Continued)

FOREIGN PATENT DOCUMENTS

JP 2000514238 A 10/2000
JP 2010206199 A 9/2010

(Continued)

OTHER PUBLICATIONS

Waiblinger, M. et ai, ("The door opener for EUV mask repair", Proceedings of SPIE, vol. 8441, 2012, pp. 84410F-1-84410F-10) supplied by applicant.*

(Continued)

*Primary Examiner* — Anand Bhatnagar
(74) *Attorney, Agent, or Firm* — Kwan & Olynick LLP

(57) ABSTRACT

Disclosed are methods and apparatus for inspecting an extreme ultraviolet (EUV) reticle is disclosed. An inspection tool for detecting electromagnetic waveforms is used to obtain a phase defect map for the EUV reticle before a pattern is formed on the EUV reticle, and the phase defect map identifies a position of each phase defect on the EUV reticle. After the pattern is formed on the EUV reticle, a charged particle tool is used to obtain an image of each reticle portion that is proximate to each position of each phase defect as identified in the phase defect map. The phase defect map and one or images of each reticle portion that is proximate to each position of each phase defect are displayed or stored so as to facilitate analysis of whether to repair or discard the EUV reticle.

20 Claims, 12 Drawing Sheets

Related U.S. Application Data

(60) Provisional application No. 61/659,804, filed on Jun. 14, 2012.

(56) References Cited

U.S. PATENT DOCUMENTS

| | | | |
|---|---|---|---|
| 6,925,202 B2* | 8/2005 | Karklin et al. | 382/145 |
| 6,970,589 B2* | 11/2005 | Crell | 382/144 |
| 7,072,502 B2* | 7/2006 | Hemar et al. | 382/144 |
| 7,179,568 B2* | 2/2007 | Cerrina et al. | 430/5 |
| 7,646,906 B2* | 1/2010 | Saidin et al. | 382/144 |
| 7,738,093 B2* | 6/2010 | Alles et al. | 356/237.5 |
| 8,455,838 B2 | 6/2013 | Shadman et al. | |
| 8,711,346 B2* | 4/2014 | Stokowski | 356/237.2 |
| 8,748,063 B2* | 6/2014 | Gallagher et al. | 430/5 |
| 8,785,082 B2 | 7/2014 | Xiong et al. | |
| 2005/0008944 A1* | 1/2005 | Cerrina et al. | 430/5 |
| 2009/0091752 A1 | 4/2009 | Terasawa et al. | |
| 2010/0149505 A1 | 6/2010 | Sewell et al. | |
| 2010/0227261 A1 | 9/2010 | Shiraishi | |
| 2011/0181868 A1 | 7/2011 | Stokowski | |
| 2011/0231134 A1* | 9/2011 | Yoshitake | 702/94 |
| 2011/0299759 A1 | 12/2011 | Shi et al. | |
| 2012/0039522 A1* | 2/2012 | Dirksen et al. | 382/144 |
| 2013/0156939 A1* | 6/2013 | Budach et al. | 427/8 |
| 2013/0336574 A1 | 12/2013 | Nasser-Ghodsi et al. | |
| 2014/0038087 A1 | 2/2014 | Gallagher et al. | |
| 2014/0165236 A1* | 6/2014 | Budach | G03F 1/146 850/9 |

FOREIGN PATENT DOCUMENTS

| | | |
|---|---|---|
| JP | 2012089580 A | 5/2012 |
| KR | 1020100074626 A | 7/2010 |
| WO | 9945565 A1 | 9/1999 |
| WO | 2010147846 A2 | 12/2010 |
| WO | 2013158593 A1 | 10/2013 |

OTHER PUBLICATIONS

Rice, Bryan et al. (Overview of EUV Mask Metrology, Sematech Inc. Litho Forum 2010, published Jun. 06, 2011).*

Okoroanyanwu, Uzodinma et al. ("Assessing EUV Mask Defectivity," Proc. of SPIE vol. 7636, 7636J, 2010).*

"U.S. Appl. No. 13/905,448, Notice of Allowance mailed Oct. 6, 2014", 10 pgs.

"Int'l Application Serial No. PCT/US2013/044739, Search Report and Written Opinion mailed Sep. 17, 2013", 9 pgs.

"European Application Serial No. 13803745.2, Search Report and Opinion mailed Jan. 18, 2016", 10 pgs.

Waiblinger, M., et al., "The door opener for EUV mask repair", Proceedings of SPIE, vol. 8441, 2012, pp. 84410F-1-84410F-10.

Wurm, Stefan, "Transition to EUV Lithography", IEEE, Apr. 2012, 2 pgs.

Yamane, Takeshi et al., "Improvement in actinic blank inspection and characterization of phase defects", Proc. SPIE 7823, 2010, pp. 1-8.

Yamane, Takeshi et al., "Phase defect analysis with actinic full-field EUVL mask blank inspection", Proc. SPIE 8166, 81660G, 2011, pp. 1-8.

"Japanese Application Serial No. 2015-517319, Office Action mailed Feb. 20, 2017", 9 pgs.

Kato, Kokoro, "Photomask and Next-Generation Lithography Mask Technology XIX", Proceedings of SPIE, vol. 8441, Apr. 17, 2012, 12 pgs.

* cited by examiner

APPARATUS AND METHODS FOR INSPECTING EXTREME ULTRA VIOLET RETICLES

CROSS-REFERENCE TO RELATED APPLICATION

This application is a continuation of and claims the benefit under 35 U.S.C. §120 of U.S. application Ser. No. 13/905,448, entitled APPARATUS AND METHODS FOR INSPECTING EXTREME ULTRA VIOLET RETICLES, filed 30 May 2013 by Mehran Nasser-Ghodsi et al., which claims priority of U.S. Provisional Patent Application No. 61/659,804, entitled METHOD FOR INSPECTING AND IMPROVING THE QUALITY OF EUV PATTERNED MASKS, filed 14 Jun. 2012 by Mehran Nasser-Ghodsi et al. Both applications are incorporated herein by reference in their entirety for all purposes.

TECHNICAL FIELD OF THE INVENTION

The invention generally relates to the field of reticle inspection and metrology. More particularly the present invention relates to inspection and measurement of extreme ultra-violet (EUV) reticles (or masks).

BACKGROUND

Generally, the industry of semiconductor manufacturing involves highly complex techniques for fabricating integrating circuits using semiconductor materials which are layered and patterned onto a substrate, such as silicon. An integrated circuit is typically fabricated from a plurality of reticles. Initially, circuit designers provide circuit pattern data, which describes a particular integrated circuit (IC) design, to a reticle production system, which transforms the pattern data into a plurality of reticles. One emerging type of reticle is an extreme ultraviolet (EUV) reticle that is comprised of a plurality of mostly reflecting layers and a patterned absorber layer.

Due to the large scale of circuit integration and the decreasing size of semiconductor devices, the reticles and fabricated devices have become increasingly sensitive to defects. These defects, if uncorrected, can cause the final device to fail to meet the desired performance due to electrical timing errors. Even worse, such defects can cause the final device to malfunction and adversely affect yield.

It would be beneficial to provide a system and techniques that are suitable for inspecting and measuring EUV reticles for defects and using such defect results, for example, for defect evaluation and/or mask repair.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In general, certain techniques of the present invention combine the advantages of optical and electron beam (e-beam) inspection tools for detecting and identifying defects on EUV masks. An optical inspection includes detection of phase defects on a EUV mask blank and obtaining a phase defect map with respect to positions on the EUV mask. The blank mask is subsequently patterned by a mask writer. After patterning, a high-throughput e-beam apparatus is then used to inspect the patterned reticle with sufficient resolution to detect and characterize pattern defects. The phase defect map may also be used to obtain images at the phase defect positions. The phase defect map, pattern defect map, and reticle pattern may be analyzed together or individually to determine whether to repair, discard, or use the reticle.

In one embodiment, a method of inspecting an extreme ultraviolet (EUV) reticle is disclosed. An optical inspection tool is used to obtain a phase defect map for the EUV reticle before a pattern is formed on the EUV reticle, and the phase defect map identifies a position of each phase defect on the EUV reticle. After the pattern is formed on the EUV reticle, a charged particle tool is used to obtain an image of each reticle portion that is proximate to each position of each phase defect as identified in the phase defect map. The phase defect map and one or images of each reticle portion that is proximate to each position of each phase defect are displayed or stored so as to facilitate analysis of whether to repair or discard the EUV reticle.

In a specific implementation, the method includes using a charged particle tool to obtain a pattern defect map for the EUV reticle after the pattern is formed on the EUV reticle. The pattern defect map identifies a position of each pattern defect on the EUV reticle. In this implementation, the pattern defect map is displayed and/or stored in association with the phase defect map and one or images of each reticle portion that is proximate to each position of each phase defect so as to further facilitate analysis of whether to repair or discard the EUV reticle. In a further aspect, the method also includes (i) prior to using the EUV reticle in a photolithography process, simulating an exposure pattern that would result from each pattern defect and phase defect on the EUV reticle based on the phase defect map and the pattern defect map, (ii) prior to using the EUV reticle in a photolithography process, analyzing the simulated exposure pattern to determine whether one or more pattern or phase defects are predicted to cause a problem in a device that is fabricated with the EUV reticle and whether such problem can be mitigated by altering the pattern of the EUV reticle, wherein simulating and analyzing the simulated exposure pattern are performed without use of a design database that was utilized to fabricate the EUV reticle, and (iii) if one or more pattern or phase defects are predicted to cause a problem that can be mitigated, altering the pattern of the EUV reticle so as to mitigate the problem.

In another aspect, the position of each phase defect is referenced with respect to a first stage coordinate system of the optical inspection tool and the position of each pattern defect is referenced with respect to a second stage coordinate system of the charged particle inspection tool. In this aspect, both the first and second stage coordinate systems are based on a plurality of fiducial marks of the EUV reticle. In yet another aspect, the pattern defect map is obtained by compensating for design differences between reticle portions that are designed to result in identical exposed patterns when using the EUV reticle in a photolithography process and are designed to compensate for at least a flare effect of the photolithography process. In a specific example, the pattern defect map is obtained via multiple beams of the charged particle tool scanning simultaneously across the EUV reticle. In one example, the multiple beams have a number greater than 25. In another embodiment, the pattern defect map is obtained by comparing each of a plurality of test images of the EUV reticle with a corresponding reference image that is determined by performing rigorous electromagnetic simulations on design data for the EUV reticle so as to model fabrication of a reticle model and to model obtaining an image of such reticle model using a charged particle inspection tool.

In yet another example, the method includes analyzing a position of each of a plurality of phase defects as identified by the phase defect map relative to a design pattern, which can be used to form the pattern on the EUV reticle, to determine whether such phase defect is predicted to cause a problem in a device that is fabricated with the EUV reticle after it is patterned with the design pattern and whether such problem can be mitigated by altering the design pattern of the EUV reticle prior to forming the pattern on the EUV reticle. If one or more phase defects are predicted to cause a problem that can be mitigated, the design pattern is altered and the altered design pattern is used to form the pattern on the EUV reticle so as to mitigate the problem.

In other embodiments, the invention pertains to system having an optical inspection tool configured to inspect a EUV reticle, which is unpatterned, and generate a phase defect map that specifies a plurality of phase defects and their associated positions on the EUV reticle and a charged particle inspection tool configured to inspect the EUV reticle after a reticle pattern is formed on such EUV reticle and obtain a pattern defect map that specifies a plurality of pattern defects and their associated positions on the EUV reticle. The charged particle inspection tool is further configured to obtain an image at each phase defect's associated position on the EUV reticle The system further comprises an analyzer that is configured to perform one or more of the above methods. In one embodiment, the analyzer is configured for determining whether one or more pattern or phase defects are predicted to cause a problem in a device that is fabricated with the EUV reticle and whether such problem can be mitigated by altering the pattern of the EUV reticle.

In a specific implementation, the analyzer forms part of the charged particle inspection tool. In another embodiment, the charged particle inspection tool and the optical inspection tool are in the form of an integrated cluster system. In a specific embodiment, the charged particle inspection tool is configured to form a plurality of beam columns, and the system further includes a reticle repair tool for repairing the EUV reticle if one or more pattern or phase defects are predicted to cause a problem that can be mitigated. In a further aspect, the beam columns are formed by using a magnetic flux by-pass plate with multiple bores that perturb a large-scale B field so as to produce lensing fields for each of the beam columns, and the charged particle tool includes the magnetic flux by-pass plate with multiple bores. In yet another aspect, the charged particle inspection tool is configured to form more than 25 beam columns.

In another embodiment, the invention pertains to an apparatus for reviewing inspection results for a EUV reticle. The apparatus includes a display for displaying images and a controller that is configured to perform one or more of the above methods.

These and other aspects of the invention are described further below with reference to the figures.

DETAILED DESCRIPTION OF EXAMPLE EMBODIMENTS

In the following description, numerous specific details are set forth in order to provide a thorough understanding of the present invention. The present invention may be practiced without some or all of these specific details. In other instances, well known component or process operations have not been described in detail to not unnecessarily obscure the present invention. While the invention will be described in conjunction with the specific embodiments, it will be understood that it is not intended to limit the invention to the embodiments.

INTRODUCTION

Figure 1:
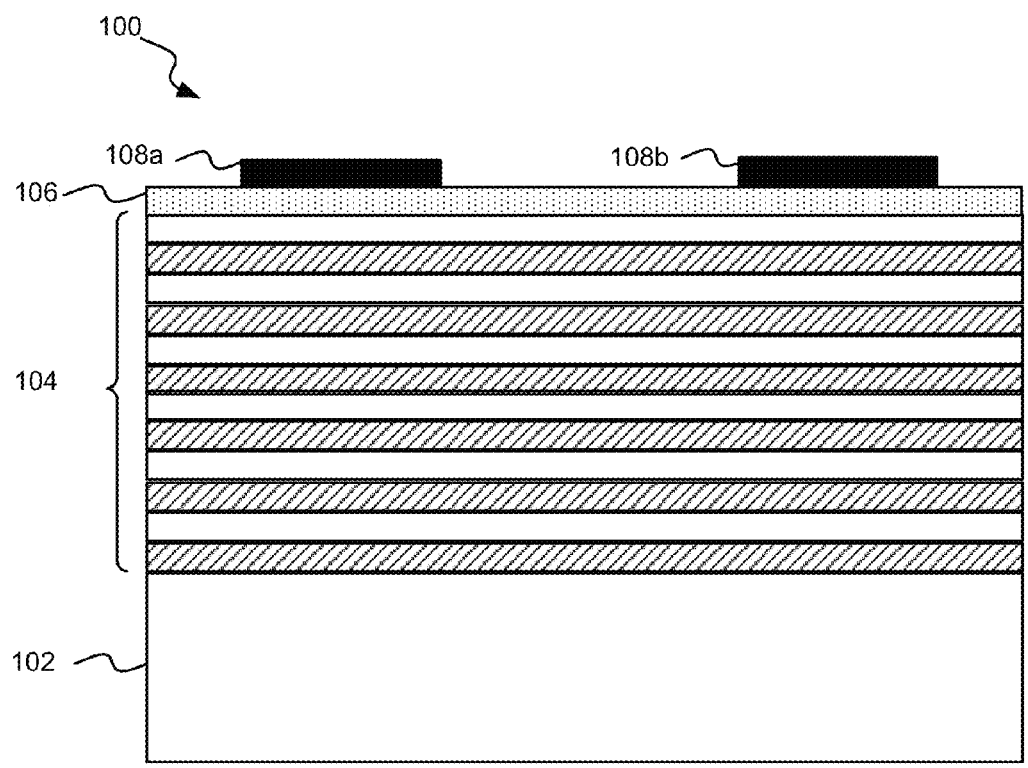
FIG. 1 is a diagrammatic representation of a side view of an example EUV reticle.

An extreme ultraviolet (EUV) lithography process typically uses an EUV type reticle that is designed to facilitate patterning on a wafer at EUV wavelengths, such as 13.5 nm. FIG. 1 is a diagrammatic representation of a side view of a portion of an example EUV reticle. As shown, the EUV reticle 100 may include a substrate 102, such a low thermal expansion (LTE) or ultra-low expansion (ULE) glass plate. The substrate is covered with multiple layers 104 of materials to provide moderate reflectance (e.g., 60-70% or more) at the EUV wavelength for performing lithographic exposure at EUV wavelengths. The multilayer stack 104 serves as a Bragg reflector that maximizes the reflection of EUV radiation while being a poor absorber of the EUV radiation. Reflection generally occurs at interfaces between materials of different indices of refraction with higher differences causing more reflectivity. Although indices of refraction for materials exposed to wavelengths that are extremely low are about equal to 1, significant reflection can be achieved through use of multiple layers having alternating layers of different refractive indices. The multilayer stack also may be comprised of low absorption characteristics so that the impinging radiation is reflected with little loss. In certain embodiments, the multiple layers 104 include between about 30 to 40 (or 40 to 50) alternating pairs of molybdenum (Mo) and silicon (Si) layers arranged with about 7 nanometer pitch. Other suitable layers may include alternating layers of $Mo_2C$ and Si, Mo and beryllium (Be), molybdenum ruthenium (MoRu) and Be.

The multiple layers 104 may be covered with a capping layer 106, such as Ru, to prevent oxidation. In other embodiments, an EUV reticle may include a quartz, antireflective coating (ARC), and other features. A pattern (e.g., 108a and 108b) is formed in an absorber layer that is disposed over the multiple layers 104. For example, a tantalum boron nitride film topped by a thin anti-reflective oxide acts as a EUV absorber. The material(s) used for the reticle pattern may be selected to have nearly zero etch bias so as to achieve ultra-fine resolution features.

Figure 2:
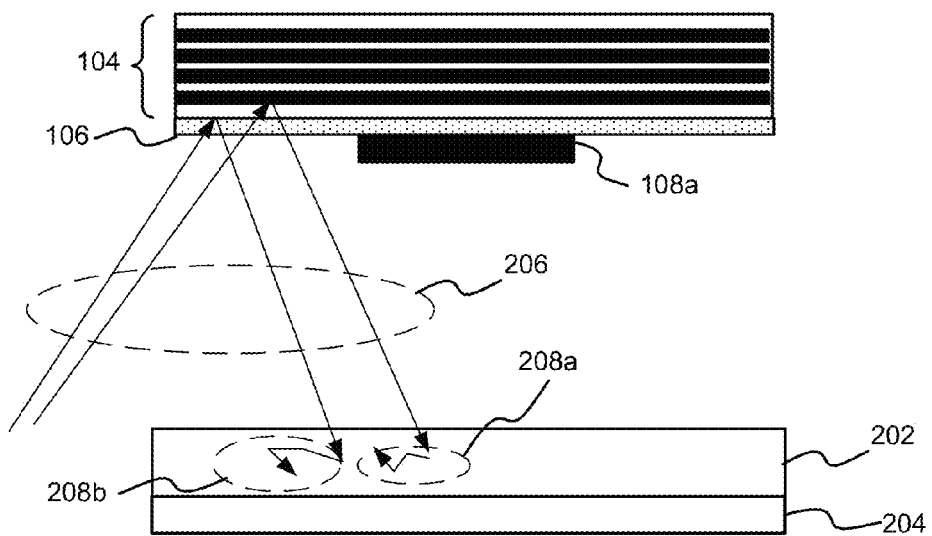
FIG. 2 illustrates a side view perspective of an EUV reticle and wafer in an EUV photolithography process.

In general, any suitable EUV photolithography process may be implemented to expose a photoresist layer on a wafer via a EUV reticle. FIG. 2 illustrates a side view perspective of a reticle and a wafer sample in a EUV photolithography process. The light source of a photolithography system may produce any suitable radiation that is suitable for use with EUV reticles. For instance, EUV wavelengths between about 11 to 14 nm or lower soft x-ray wavelengths may be utilized. In a specific implementation, a wavelength of about 13.5 nm is produced.

During photolithography, radiation 206 that is reflected from the multiple layers 104 of a EUV reticle is absorbed in a resist layer 202 formed on a wafer substrate 204. The absorbed radiation produces photoacids (H+) and amplified photoacids (e.g., 208a and 208b) that form an exposed pattern in the resist layer 202 of the wafer substrate 204 that corresponds to the absorber pattern layer, e.g., 106a, of the EUV reticle when the photo resist is developed. Reflective imaging optics between the EUV reticle and the wafer is omitted in FIG. 2 for clarity.

Optical inspection with deep ultra-violet (DUV) or 193 nm light currently is at its limit of being able to detect very small defects in an EUV mask that may cause problems in printing semiconductor wafers with critical features below 22 nm in size. An electron beam (e-beam) inspection tool typically has sufficient resolution to detect such small defects. However, an e-beam inspection is not sensitive to phase defects on a EUV mask. Additionally, current single-column e-beam systems tend to be too slow so that they are not practical for inspecting a full reticle.

EUV Reticle Inspection Embodiments

Certain embodiments of the present invention combine an optical inspection for finding phase defects on a blank EUV reticle and a high-speed e-beam inspection for finding small pattern defects, as well as imaging reticle locations of the detected phase defects, on a patterned EUV reticle. This combination results in a phase defect map and a patterned defect map for a particular EUV reticle that may be used for defect compensation and reticle repair. These techniques also include excellent coordinate accuracy of the phase defect map (from the optical system) and the pattern defect map (from the e-beam system).

Figure 3:
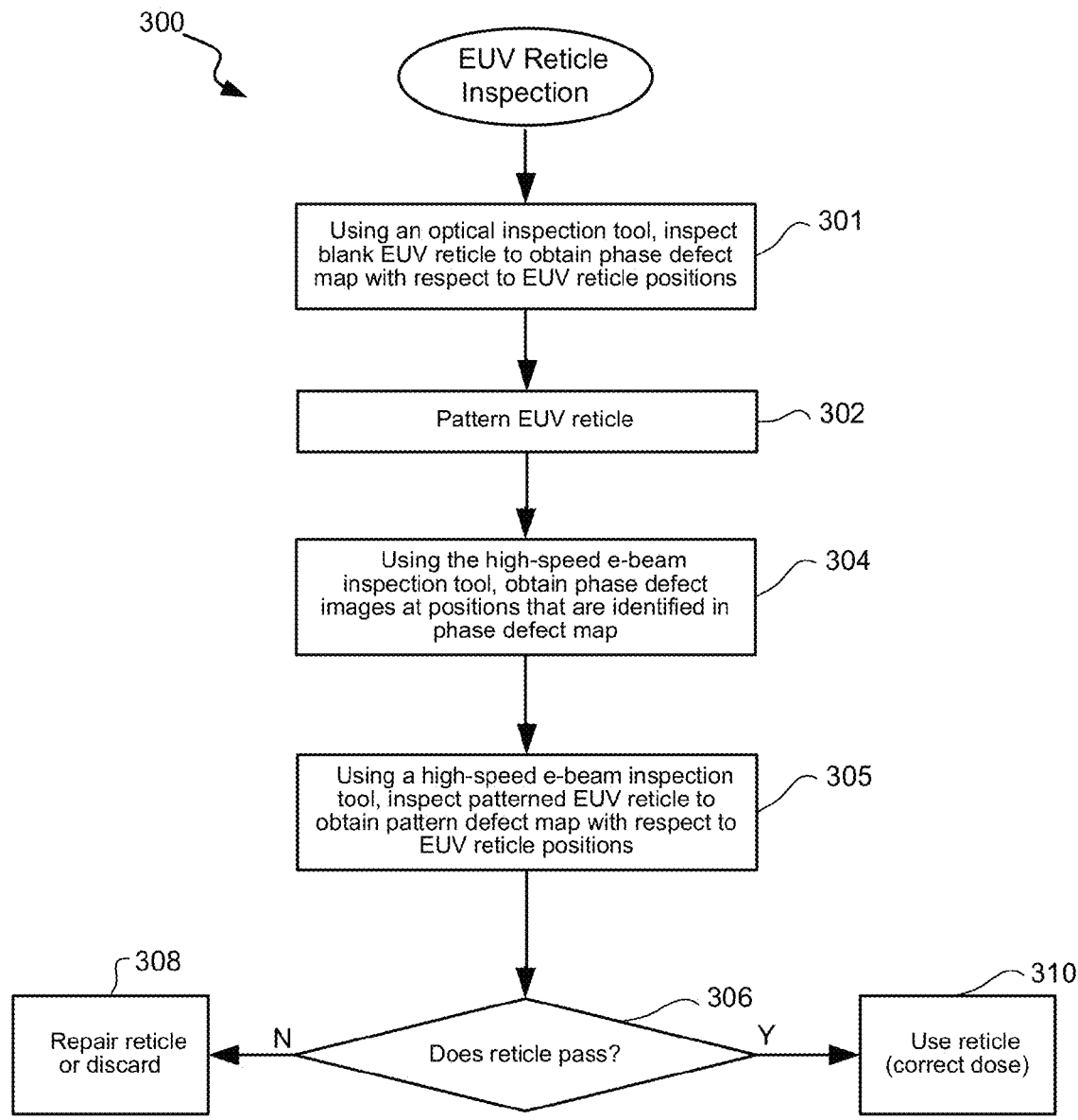
FIG. 3 is a flow chart illustrating a combined optical and e-beam inspection of an EUV reticle in accordance with one embodiment of the present invention.

FIG. 3 is a flow chart illustrating a combined optical and e-beam inspection 300 of a EUV reticle in accordance with one embodiment of the present invention. Using an optical inspection tool, a blank EUV reticle is initially inspected to obtain a phase defect map with respect to EUV reticle positions in operation 301.

In a specific example, a multilayer EUV mask blank is inspected for phase defects, such as bumps and pits, using a specifically configured deep ultraviolet (DUV) inspection system. The inspection system may use light in wavelengths less than 193 nm (DUV) or alternatively light of wavelengths in the 40 to 200 nm range (VUV). In yet another embodiment, the inspection tool may use a 13.5 nm wavelength or the same wavelength as the photolithography tool in which the EUV reticle is to be used. Any of these inspection systems may also be configured to perform darkfield or brightfield inspections.

In a specific example, an inspection system is configured with a partial coherence sigma of between about 0.15 and 0.5. A reflected light may be captured by a time delay integration (TDI) detector and passed to a computer system for analysis. A signal to noise ratio (SNR) can be improved by applying specially designed filters, thresholds, and correction factors. Such specifically configured DUV systems can be used to detect phase defects as small 1 nanometer in height and 50 nanometers in full width half maximum (FWHM).

Figure 4A:
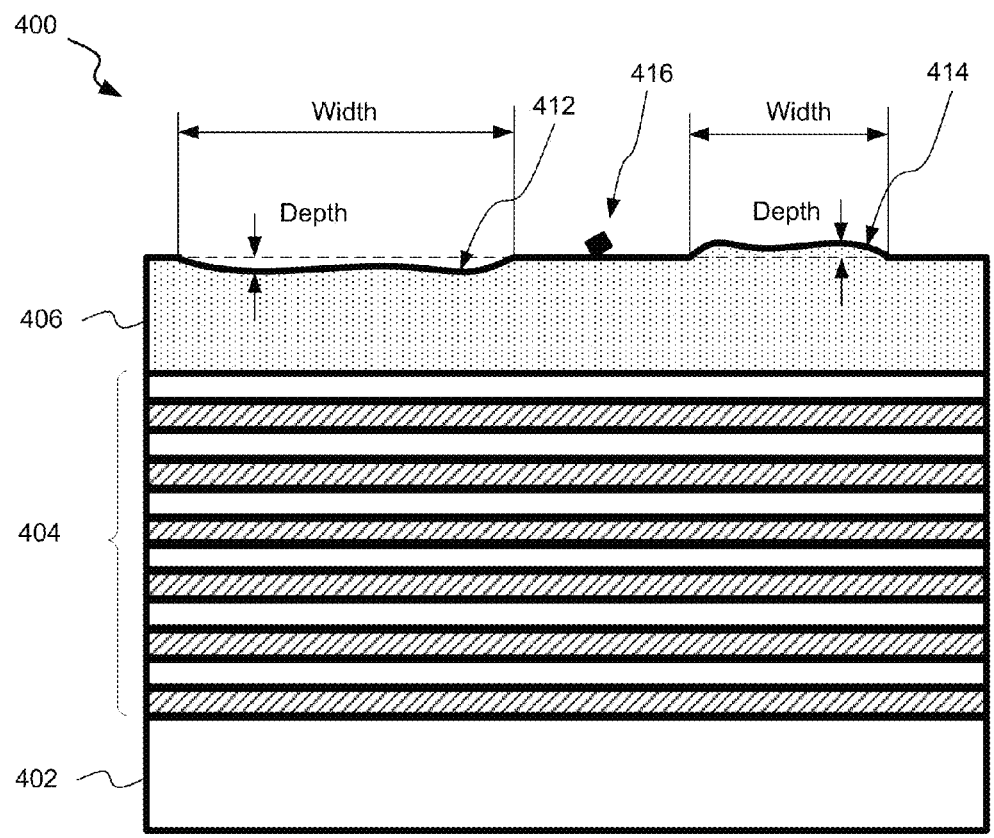
FIG. 4A is a side view schematic representation a EUV mask blank in accordance with certain embodiments.

FIG. 4A is a side view schematic representation of a EUV mask blank 400 in accordance with certain embodiments. As shown, EUV mask blank 400 includes a substrate 402, such a low thermal expansion (LTE) glass sheet. The substrate is covered with multiple layers (ML) 404 of materials to provide good reflectance at the EUV wavelength for facilitating lithographic exposure on a specimen, such as a semiconductor wafer. The multiple layers 404 may include a capping layer 406. In other embodiments, a blank reticle includes any number and type of deposited layers, such as a subset of the ML layers 404 illustrated in FIG. 4A.

A blank EUV reticle may be inspected after each single layer is deposited on the substrate 402. In another example, the blank EUV reticle is inspected after all or a portion of the ML layers 404 are deposited, but prior to depositing of the capping layer 406.

EUV mask blanks and other sample types sometimes have surface defects. The defects can be generally characterized as phase defects, such as pit 412 and bump 414, and particles 416. These bumps and pits usually arise from defects at the substrate, 402. Thus, the layers are typically also distorted (although not shown). While bumps and pits are almost purely optical phase objects, particles have both amplitude and phase characteristics. Both types of defects can be very damaging to EUV lithography and need to be carefully detected and analyzed. For example, a phase shift caused by a 1 nanometer high bump is sufficient to produce a printable defect.

Actinic (e.g., 13.5 nanometers) inspection tools can be used for inspection of these defects, but these tools are not expected to be available for several years in high throughput configurations suitable for non-academic uses. Currently available systems have either throughput or sensitivity limitations. For example, multi-beam confocal microscopes supplied by LaserTec in Yokohama, Japan detect surface disturbances by monitoring reflective signals. However, these microscopes have a poor sensitivity and are generally not suitable for inspection of EUV mask blank defects. Higher illumination powers could improve the sensitivity but they are often damaging to EUV mask blanks Dark-field 13.5 nanometer microscopes have been proposed for EUV mask blank inspection, but these dark-field systems may be extremely slow and not suitable for production uses.

Several embodiments for inspecting a blank EUV reticle are further described in U.S. Patent Application 2011/0181868, filed 13 Apr. 2011 by Stanley E. Stokowski, which application is incorporated herein by reference in its entirety. In general, it has been found that a DUV inspection system can be configured for inspection of small surface defects on EUV mask blanks and other similar samples. In accordance with a specific embodiment, the Teron 600 inspection system, available from KLA Tencor in Milpitas, Calif., has been reconfigured for inspection phase defects as small as 1 nanometer in height and 80 nanometers FWHM on typical EUV mask blanks. It has been also found that DUV systems can be also configured for inspecting particle defects.

Figure 4B:
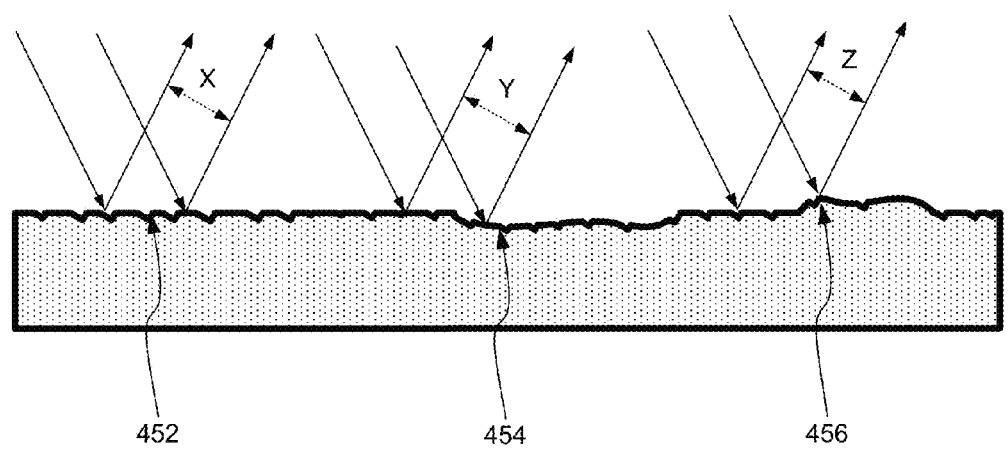
FIG. 4B is a side view schematic illustration of a EUV mask blank surface exemplifying an inspection of two types of phase defects in accordance with certain embodiments.

FIG. 4B is a side view schematic illustration of a EUV mask blank surface exemplifying an inspection of two types of phase defects in accordance with certain embodiments. A substantially flat portion 452 of the inspected surface is shown as a reference to illustrate phase shift differences in the light beams reflected from the pit 454 and the bump 456. It should be noted that a surface roughness produces some additional phase fluctuations, which become a part of the overall background noise. A surface roughness is generally consistent across the entire sample surface, which includes both flat portions (such as element 452) as well defects (such as elements 454 and 456). As such, a roughness can be at least partially compensated for by applying a specifically designed filter. Such filter could substantially increase a signal to noise ratio.

When the pit 454 is inspected, the reflected light has the same amplitude as the reflected light from the flat portion 452. However, the reflected light from the pit 454 has a negative phase difference (Y) when compared to that of the flat surface (X). Likewise, when the bump 456 is inspected, the reflected light has the same amplitude, but it now has a positive phase difference (Z) in comparison to the reference (X). In certain embodiments, a portion of the inspected surface or the entire surface can be used as a phase value reference in order to determine phase shifts.

An optical amplitude (D) for laterally small defects can be expressed with the following formula:

$$D = \exp(i\phi)S = 1$$

A phase ($\phi$) corresponds to the mean defect phase integrated over a point spread function. An optical amplitude (S) of the flat surroundings is set to one. An image contrast can be achieved by mixing multiple optical amplitudes using a point spread function. Thus, the defect intensity contrast can be expressed with the following formula:

$$\text{Contrast} \approx |S|^2 - \left|\frac{S+D}{2}\right|^2$$
$$= -\frac{1}{2}[1 - \cos(\phi)]$$
$$= -\frac{1}{2}\sin^2(\phi/2)$$
$$\cong -\frac{\phi^2}{8}$$

For small phase values ($\phi$), the sinusoidal function can be approximated as a linear function.

Figure 5:
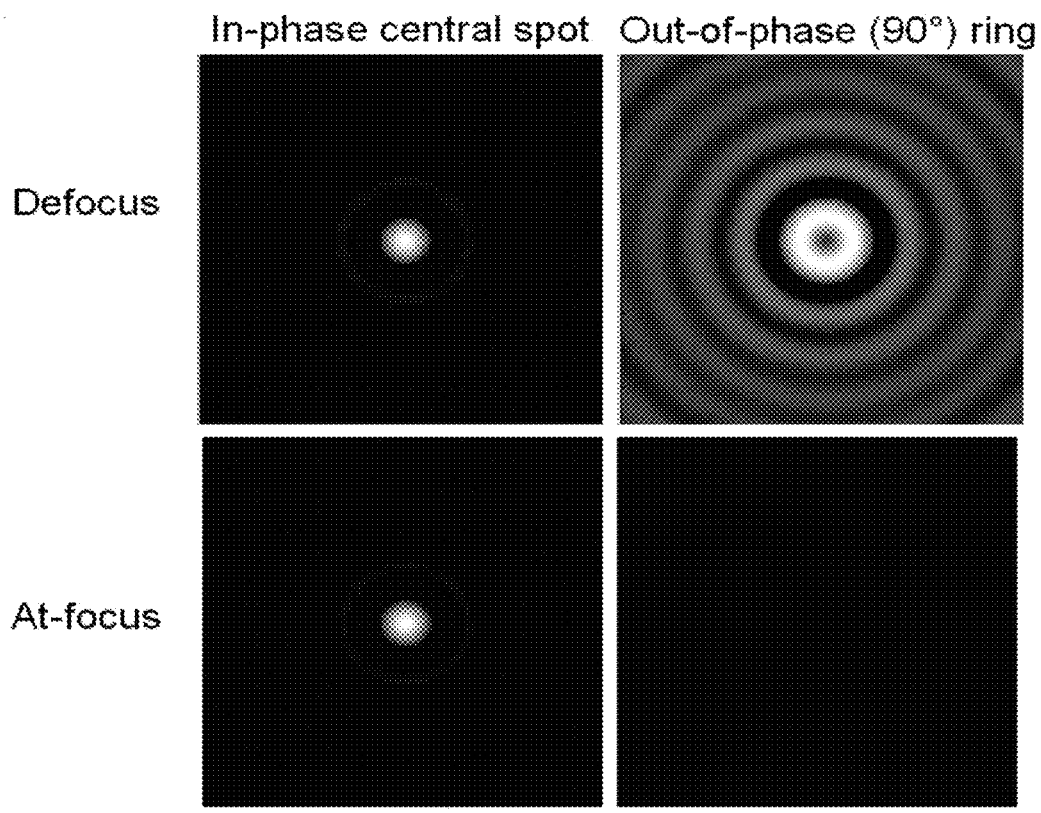
FIG. 5 illustrates four simulated images of the optical system point spread function at a focal point and a certain defocused point and shown as an in-phase central spot and out-of-phase (90°) ring.

However, a contrast value is relatively small for shallow defects. In order to increase the contrast, an illuminating light beam can be defocused to shift the relative phases of the flat surroundings (S) and defect (D). At a focus (depth of focus (DOF) about equal to 0), the point spread function has only a real part. However, under defocus conditions (DOF<0 or DOF>0), the point spread function has an imaginary part that corresponds to a ring shape. This phenomena is illustrated in FIG. 5, which has four simulated images of the optical point spread function at a focal point and a certain defocused point. The images were captured as both an in-phase central spot and an out-of-phase (90°) ring. In other words, the image contrast can be achieved by mixing of a central spot and a ring, which are 90° out of phase with respect to each other. As such, the contrast or phase defect can be expressed with the following formula:

$$\text{Contrast} \approx |S|^2 - \left|\frac{S+iD}{\sqrt{2}}\right|^2$$
$$= \sin(\phi)$$
$$\approx \phi$$

Figure 6:
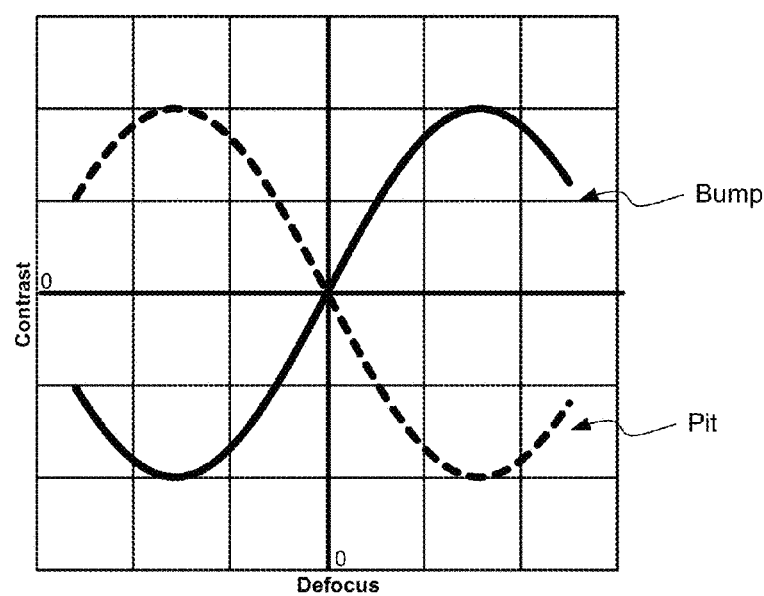
FIG. 6 is an illustrative plot of contrast as a function of focal point position for two types of phase defects.

In this last contrast expression, the contrast value is linearly proportional to the phase value ($\phi$) for small phase values. Bumps and pits will have opposite contrast signs, and the contrast sign will flip when switching from positive to negative DOF. FIG. 6 illustrates a plot of a contrast as a function of a focal point position, i.e., DOF, for two types of phase defects. One defect is a bump extending above the surface and another defect is a pit protruding below the surface. Both types of defects are shown to have the same dimensions, e.g., 1 nanometer in height and about 70 nanometers in FWHM, and inspected using the same systems, e.g., a DUV inspection system. A contrast is nearly zero at focus, i.e., DOF~0. Therefore, phase defects can be inspected using one or more defocused positions (DOF<0 or DOF>0). When multiple inspection passes are performed and/or multiple beams used in the same pass, multiple defocused settings may be used. For example, a combination of positive and negative DOFs may be used. In the same or other embodiments, a combination of defocused (DOF<0 or DOF>0) and focused positions (DOF~0) may be used.

Focused positions may be used, for example, to detect particles as further explained below. Unlike phase defects, particles have different optical properties. Particles scatter more light outside of the imaging aperture and are considered to be both amplitude and phase objects. Furthermore, particles are generally larger than typical phase defects or, more specifically, than a typical height of EUV mask blank phase defects. Therefore, different DOF are often needed for particle detection than for phase defect defection. More specifically, being mostly "amplitude objects", particles are best detected near focus (DOF~0). However, particles can still provide significant modulation even at defocused conditions.

In general, certain blank EUV reticle inspection techniques may include illuminating an inspected surface with a light beam that has a wavelength of less than about 250 nanometers. The beam is passed through a collection of optical elements that have a partial coherence sigma of between about 0.15 and 0.5. The beam is focused onto the inspected surface at one or more of focused and/or defocused conditions. A reflected light beam is collected by a detector and can be used to construct a resultant image of the inspected surface. This operation may include applying various filters and thresholds. Certain embodiments of a blank EUV inspection technique are described in the paper authored by Stan Stokowski, Joshua Glasser, Gregg Inderhees, and Phani Sankuratri, entitled "Inspecting EUV mask blanks with a 193 nm system," published in the Society of Photographic Instrumentation Engineers (SPIE) proceedings of the, volume 7636, pp. 76360Z-76360Z-9 (2010), which paper is incorporated herein by reference in its entirety.

Figure 7:
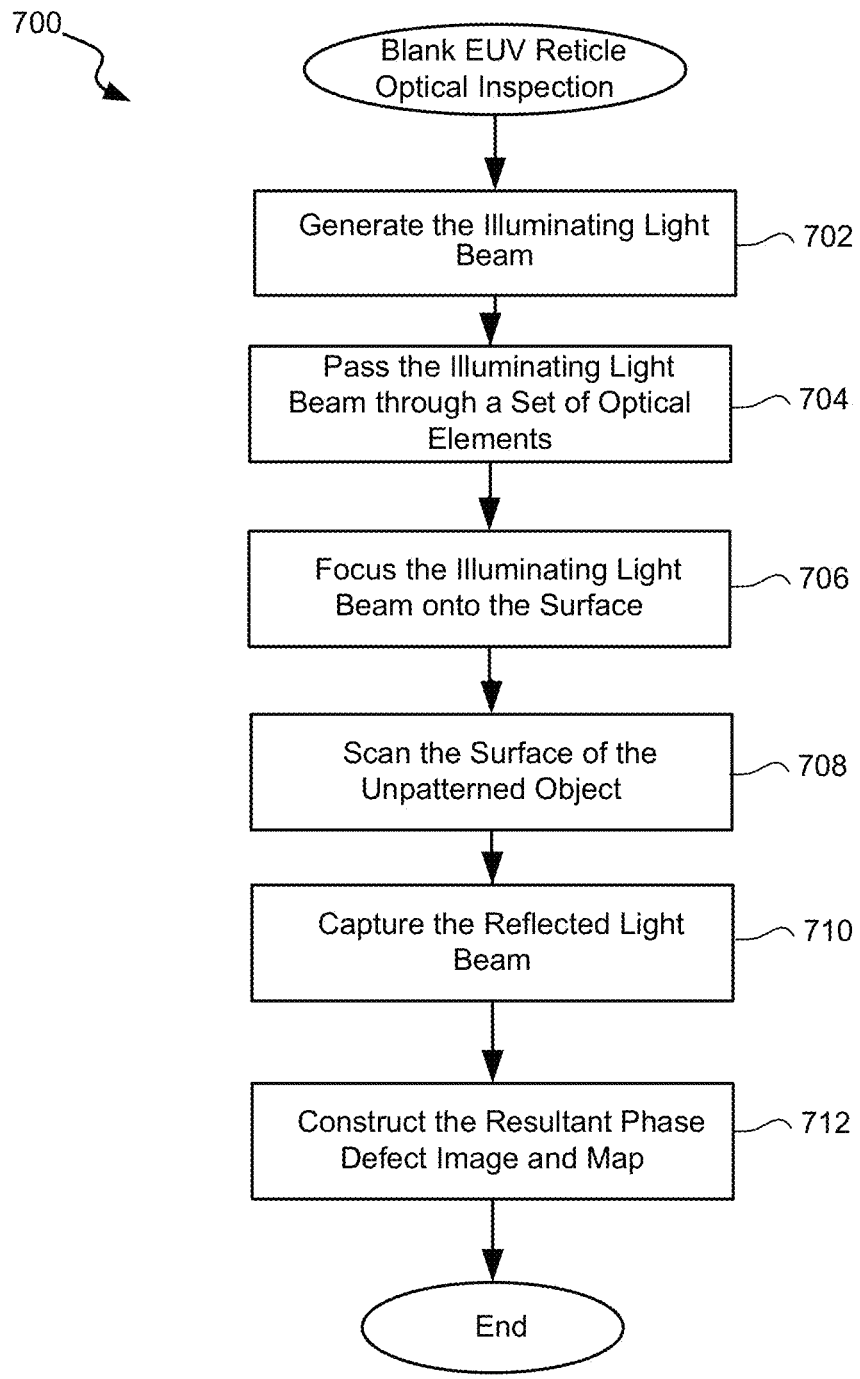
FIG. 7 illustrates a flow chart corresponding to an optical inspection process for detecting phase defects and/or particles on a surface of an unpatterned object, such as a blank EUV reticle, in accordance with certain embodiments.

FIG. 7 illustrates a flowchart corresponding to a process 700 for inspecting phase defects and/or particles on a surface of an unpatterned object, such as a blank EUV reticle, in accordance with certain embodiments. This process can be used to detect phase defects that are less than about 10 nanometers in height and less than about 200 nanometers in FWHM. In more specific embodiments, these techniques are used to detect phase defects that are less than about 5 nanometers in height, and 150 nanometers in FWHM, or less than about 3 in height and 100 nanometers in FWHM, or less than about 2 nanometers in height and 80 nanometers in FWHM, or even less than about 1 nanometer in height and 50 nanometers in FWHM. An unpatterned object may be a EUV mask blank or any other similar unpatterned object. In certain embodiments, a surface of the inspected object includes quartz and/or an anti-reflective coating (ARC).

The process 700 may start with generating an illuminating light beam in operation 702. In certain embodiments, an illuminating light beam has a wavelength of less than about 250 nanometers. More specifically, an illuminating light beam may be at DUV or EUV wavelengths. Various illumination sources, such as lasers, can be used for this purpose.

The process may proceed with passing an illuminating light beam through a collection of optical elements in operation 704. Some examples of optical elements include condenser lenses, projection lenses, beam splitters, mirrors, beam steering devices, and beam conditioners. The condenser and projection lenses may be selected such that their numerical apertures result in a partial coherence sigma of the inspection system to be between about 0.15 and 0.5. It should be noted that a partial coherence sigma is a ratio of a condenser lens numerical aperture to a projection lens numerical aperture. In certain embodiments, a partial coherence sigma is between about 0.2 and 0.4 or, more particularly, between about 0.25 and 0.3, or between about 0.15 and 0.3, or between about 0.15 and 0.2.

An illuminating light beam may then be focused on a surface of the inspected sample in operation 706. A defocus range may be between about +1 and +3 DOF, between about −1 and −3 DOF, or between about +1 and −1 DOF. In specific embodiments, absolute DOF values (representing both negative and positive DOF ranges) are between about 1.25 and 2.75 or, more particularly, between about 1.5 and 2.5, or even about 2. In certain embodiments, focusing operations may be accomplished by illuminating the surface with multiple illuminating beams at different DOFs and/or repeating inspection passes of the surface with light beams at different DOFs. For example, two beams may have DOF values that are opposite in sign. More specifically, one beam may have a DOF of between about +1 and +3 DOF, while another at between about −1 and −3 DOF. In another example, one beam may be defocused at between about +1 and +3 DOF, while another beam may be in focus. The second (in-focus) illuminating beam may generate an image (i.e., a focused image) for detecting particles and other contaminations. In general, multiple images generated at different DOF can be used to classify defects into phase and surface contamination defects. In certain embodiments, multiple images may be summed up during construction of a resultant image in later operations.

The process 700 may continue with inspection of the surface in operation 708 and then capturing one or more reflected light beams using one or more detectors in operation 710. A reflected light beam or at least a captured portion of that beam can be characterized based on a resolution of the detector. In certain embodiments, a reflected light beam's scan path across the detector is between about 100 pixels and 1000 pixels wide along a scanning direction or, more particularly, between about 300 pixels and 600 pixels wide. A length of the beam path may be at least about 500 pixels or, more particularly, at least about 1000 pixels. If multiple reflected beams are produced, then a multi-field detector can be used to captures these beams.

The process 700 may proceed with constructing a phase defect image and map in operation 712. This construction process may involve summing multiple images, applying various filters, thresholds, and/or concentration values, as well as performing other techniques.

Since EUV mask blanks are unpatterned objects, most or nearly all systematic noise sources can be eliminated during these operations. For example, a systematic noise can be monitored and filtered from the detected signal or image. By eliminating most of the systemic noise, the remaining signal can still contain some random noise, shot, and speckle. However, an actual non-noisy signal and signals produced by these noise factors have different spatial power spectra and can be decoupled from each other. Therefore, a filter can be designed and applied to further improve a SNR. It has been found that better "matched" filters can be designed when a partial coherence sigma is set to less than about 0.25, or even less than about 0.20.

In certain embodiments, a correction factor is applied to remove a systematic noise from the resultant image caused by pixel-to-pixel differences in the TDI gain and offsets. For example, a correction factor may be determined from a calibration procedure and applied during inspection/scanning. Further, as inspection occurs, in the absence of any detected defect, the mean value of each pixel row is monitored and determines the correction factor applied.

In certain embodiments, analyzing the resultant image comprises applying a threshold signal value of at least about 7 to detect phase defects. A threshold signal value is defined as a ratio to a standard deviation of the noise signal. Another way of increasing SNR is to perform multiple inspection passes. However, each additional inspection pass slows inspection system throughput.

In certain embodiments, an illuminating light beam is focused onto the surface at a substantially normal angle, which results in illuminating and reflected light beams sharing their paths. In other embodiments, an illuminating light beam is focused onto the surface at an oblique angle, and the illuminating and reflected light beams do not share their paths. In another embodiment, a zero order component of the reflected light beam may be further attenuated prior to reaching a detector. Furthermore, a phase of the zero order component of the reflected light beam can be shifting using an imaging aperture in order to improve the contrast and a signal-to-noise ratio.

The phase defects may be analyzed prior to patterning the EUV reticle so as to mitigate the effects of one or more of the phase defects. For instance, the design database may be used to simulate the reticle pattern. The phase defects' locations with respect to such simulated reticle pattern may then be analyzed to determine whether the reticle pattern's fabrication can be altered to mitigate the effects of one or more phase defects. Several techniques for altering a reticle pattern's fabrication are described further in U.S. Patent Application 2012/0238096 by Yalin Xiong and Stanley E. Stokowski, filed 12 Mar. 2012, which application is herein incorporated by reference in its entirety. Fabrication of a reticle can include moving one or more portions of the reticle pattern with respect to a phase defect, removing material from a line trace so as to create more distance between such line trace and a phase defect, adding material to a line trace so that the line trace substantially covers a phase defect, etc.

Figure 8:
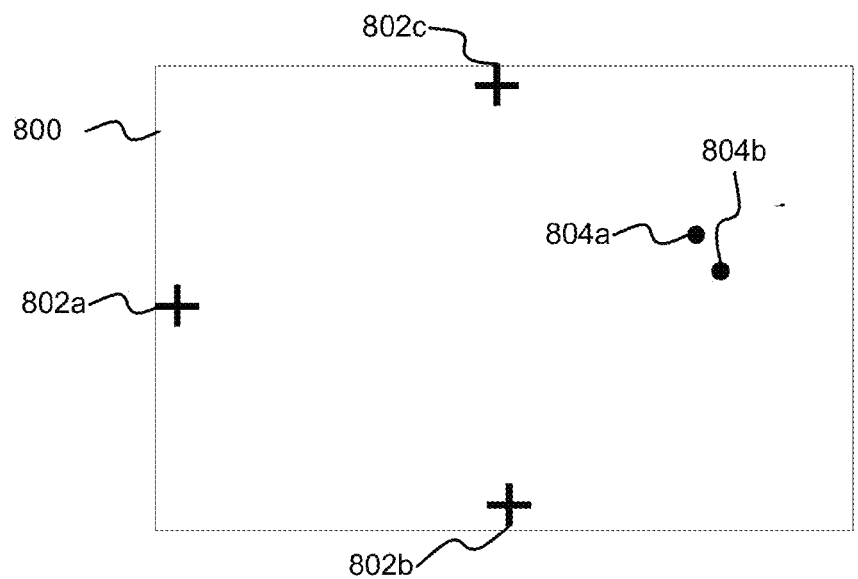
FIG. 8 is a diagrammatic representation of an image of a blank EUV reticle having phase defects.

Any suitable technique may be used to associate the detected phase defects with a particular position on the reticle to obtain a phase defect map for the EUV reticle so that such phase defect map can be later analyzed for reticle repair or deposition. For example, locations of the resulting phase defect image may be determined in relation to one or more fiducial marks on the reticle. FIG. 8 is a diagrammatic representation of an image of a blank EUV reticle 800 having phase defects (e.g., 804a and 804b) although illustrated as having exaggerated sizes. As shown, the phase defects 804a and 804b are dark intensity values overlaid with the full reticle area 800, which is a bright intensity, although the phase defects and reticle could have any relative intensity.

The fiducial marks (e.g., 802a, 802b, and 802c) may define a particular orientation of the reticle and detected defects, for example, with respect to the stage position in the inspection tool. Additionally, these fiducial marks are preferably designed to be seen by both by an optical and electron beam inspection tool. For instance, the marks are comprised of a material and have a particular size, height, and shape that are selected so that the marks result in clear images when inspected by both an optical and e-beam tool.

The particular inspection tool (e.g., optical or e-beam) may be configured to determine accurate coordinates for each detected defect (or a position of the stage on which the reticle resides) with respect to the reticle's fiducial marks. For instance, the tool can accurately measure to 30 nm or less the position of the stage (and corresponding defect) on which the reticle resides. The stage coordinate system is referenced to the reticle's fiducial marks so that any defects that are detected then have an accurate position relative to the mask fiducial marks. For example, the phase defects can be located and referenced with respect to these fiducial marks so that the phase defects have a same reference frame as the locations of the reticle pattern and other defects, such as pattern defects. For example, an image can include the phase defects at particular locations on the reticle relative to the fiducial marks. These fiducial marks can be used to align the detected phase defects, as well as other detected pattern defects, with the reticle pattern that are also located relative to such fiducial marks. For instance, an image that includes the phase defects and the fiducial marks can be aligned with an image of the reticle pattern that also includes such fiducial marks by aligning the corresponding fiducial marks from each image. For instance, the edges of each cross-shaped can be aligned in both an x and y direction. A differential intensity signal can also be calculated from the intensity signal for each fiducial mark and used to more accurately locate the edges of each fiducial mark. Each defect's location can then be determined relative to such edges, as well as relative to the reticle pattern. In another embodiment, the coordinates of each defect relative to origin coordinates of the reticle, as defined relative to the fiducial marks, may be stored in a table of defect locations. Each defect location may also reference a corresponding defect image and/or defect data, such as size and shape. The position of the reticle pattern can also be referenced with respect to such reticle origin.

Referring back to the inspection process of FIG. 3, the EUV reticle may then be patterned in operation 302. For instance, any suitable patterning technique is used to deposit and pattern a material, such as an absorber layer, onto the reticle. Specifically, after an absorber layer may be deposited on the reticle, a photoresist layer is then patterned on the reticle. The photoresist layer is then exposed to form a particular exposed design pattern and etched into a particular photoresist and underlying absorber pattern based on the exposed design pattern.

Using a high-speed e-beam inspection tool, phase defect images may then be obtained at positions that are identified in the phase defect map, which was obtained from the blank EUV reticle, in operation 304. High-definition e-beam images at the phase defect locations may facilitate review of the reticle pattern in relation to the detected phase defects. For example, a reviewer may determine whether phase defects are in a position relative to the reticle pattern that would affect the wafer printing process (e.g., a phase defect is positioned between two traces of the reticle pattern).

Using a high-speed e-beam inspection tool, the patterned EUV reticle may then be inspected to obtain a pattern defect map with respect to the EUV reticle positions in operation 305. Inspection of a patterned EUV reticle may generally be accomplished by a die-to-die, cell-to-cell, or die-to-database type of inspection. However, such reticle pattern inspection may include techniques for compensating for die-to-die differences (or the like) that are purposely designed into the EUV reticle patterns.

Prior to use of EUV lithography, other types of optical reticle patterns were designed to have identical die patterns that produce identical dies on a wafer. In contrast, EUV reticles are designed to have different die patterns to produce identical dies on a wafer. One of the reasons for this is that the field of the lithography projector has an arc-shape. The wafer and the reticle are synchronously scanned through the field, in a direction that is perpendicular to the arc. The azimuthal angle of the chief ray on the mask varies along the arc-shaped field. Different types of features, such as horizontal vs. vertical features with respect to the beam scan, also cause a different shadow effect. This difference varies along the arc. Therefore, dies aligned in the scan direction are more similar than dies on different field locations.

A second reason for dies having different patterns on the reticle is that the edge of a die that is also at the edge of the exposure field can differ from the edge of a die that is internal to the exposure field. The lithography projector steps the wafer and repeats the scan in an unexposed portion of the wafer. The edges of neighboring exposure fields overlap. The overlapping edge is exposed twice and corners can be exposed four times. No circuit pattern is multiply exposed, and measures may be taken to reduce the reflection of the reticle at the edge of the exposure field. Nevertheless, the double exposure can cause a subtle difference in the flare exposure at the edge of the exposure field.

A third possible reason for differences between die patterns on the reticle is that different portions of the light with respect to the lithography tool's field of view (FOV) will exhibit different scattering properties. For instance, light from different optical paths (e.g., different angles and different surface smoothness characteristics) will scatter differently across the FOV. The reticle patterns need to be designed to compensate for this different scattering, commonly referred to as flare effect. Accordingly, different FOV positions of the reticle pattern may be designed differently to compensate for different flare levels and different azimuth angle of the chief ray.

Since the reticle will tend to contain different die patterns for different FOV locations for flare correction, it may be difficult to detect defects across the reticle using die-to-die inspection. That is, the detected defects for a reticle may be skewed by the differences that were designed into the reticle pattern to compensate for flare and azimuthal angle dependence of the chief ray.

Figure 9:
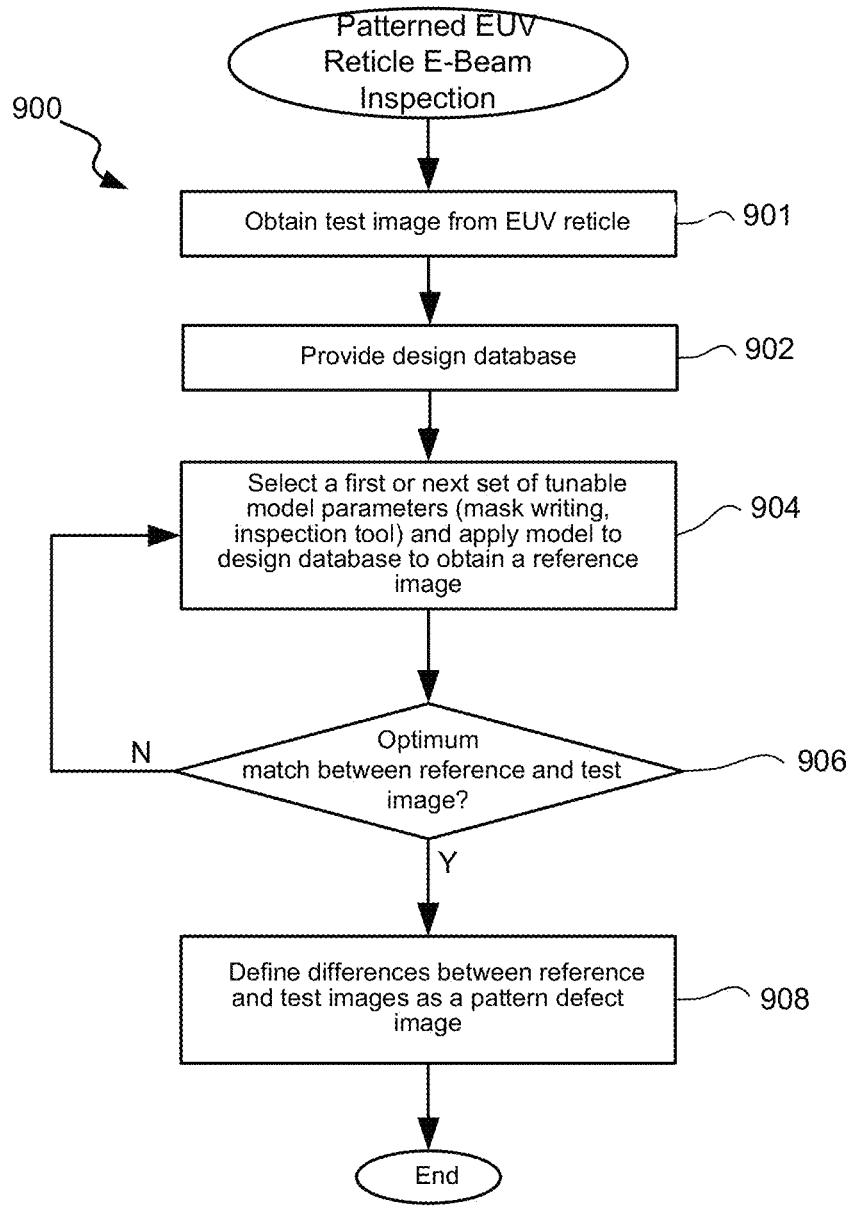
FIG. 9 is a flow chart illustrating a procedure for inspecting a patterned EUV reticle using a high-speed e-beam tool in accordance with a specific implementation of the present invention.

In one inspection and measurement approach, a die-to-database inspection is used to avoid issues in the design data due to flare compensation and vertical/horizontal bias. FIG. 9 is a flow chart illustrating a procedure 900 for inspecting a patterned EUV reticle using a high-speed e-beam tool in accordance with a specific implementation of the present invention. The inspection procedure 900 may be performed on the reticle after fabrication of such reticle and prior to such reticle being used in a photolithography process and again at any time after the reticle has been used in one or more photolithography processes. Additionally, the following operations may be applied with respect to the entire reticle or repeated for a plurality of sub-portions of such reticle. The e-beam tool may have a single column for obtaining a single image of the reticle at a time or preferably have multiple columns for simultaneously obtaining multiple images from multiple portions of the reticle.

Although not required, the operations of FIG. 9 can be performed in parallel for multiple portions of a reticle. Regardless of how the entire reticle image is obtained, the reticle image can be defined as plurality of patch images that are processed by a plurality of processors. The reticle patches may be distributed to processors that operate on the test patch data in parallel.

Initially, a test image of a EUV reticle may be obtained in operation 901. In one embodiment, patch portions of the reticle can be scanned using one or more e-beam columns to obtain image data from the entire reticle. Each patch may contain a single die or multiple dies. A patch may have any size and shape, depending on the particular system and application requirements. In general, an image of each patch portion may be obtained by scanning the reticle in any suitable manner. By way of example, a plurality of patch images may be obtained by raster scanning the reticle with multiple e-beams. Alternatively, the images may be obtained by scanning the reticle with any suitable pattern, such as a circular or spiral pattern. Of course, the sensors (one or more) may have to be arranged differently (e.g., in a circular pattern) and/or the reticle may be moved differently (e.g., rotated) during scanning in order to scan a circular or spiral shape from the reticle.

In one example, the reticle moves past a set of sensors (e.g., of multiple e-beam columns) of an inspection tool, and each electron beam scans rapidly back and forth along a line. Secondary electrons are detected from each region of beam-sample interaction. The path of each beam on the reticle, therefore, forms a rectangle, thus resulting in multiple parallel rectangular scanned areas (each of which is referred to as a "swath") on the reticle. The detected secondary electrons are converted into an image of the swath. In this embodiment, the sensors of the inspection tool are arranged in a rectangular pattern to receive secondary electrons from the reticle and generate therefrom image data that correspond to multiple parallel swaths of the reticle. In a specific example, each swath can be about 1 million pixels wide and about 1000 to 2000 pixels high. In one example, each pixel has a size of 5 nm.

Each set of image data may correspond to one or more swaths of the reticle. Each set of image data may be obtained by sequentially scanning swaths from the reticle in a serpentine or raster pattern. For example, a first set of swaths of the reticle 600 are scanned by the multiple electron beams of an e-beam inspection system from left to right to obtain a first set of image data. A set of second swaths are then scanned from right to left to obtain a second set of image data. Each set of swath data may also be divided into patches.

Image data for each patch may be obtained using an e-beam inspection tool that is set up in any suitable manner. For an EUV reticle, an e-beam inspection tool can be generally set up with a set of operating parameters or a "recipe" for obtaining image data from a patterned EUV reticle. Recipe settings may include one or more of the following settings: a setting for scanning the reticle in a particular pattern, focus setting for one or more incident beams, extractor voltage of one or more beam sources, one or more electrode voltage settings, pixel size, blanking plate setting for each e-beam column, setting for grouping adjacent signals from single signals, illumination or detection aperture settings, incident beam angle settings, other detector settings, etc.

A design database may be provided in operation 902. An integrated circuit design may be developed using any method or system known in the art such as electronic design automation (EDA), computer aided design (CAD), and other integrated circuit design software. Such methods and systems may be used to generate a design database from the integrated circuit design. The design database includes data representing a plurality of layouts for various layers of the integrated circuit. Data in the design database may be used to determine layouts for a plurality of reticles. A layout of a reticle generally includes a plurality of polygons that define features in a pattern on the reticle. Each reticle is used to fabricate one of the various layers of the integrated circuit. The layers of the integrated circuit may include, for example, a junction pattern in a semiconductor substrate, a gate dielectric pattern, a gate electrode pattern, a contact pattern in an interlevel dielectric, and an interconnect pattern on a metallization layer.

The design database may include designations identifying different types of regions of the reticle, different types of features on the reticle, and/or different portions of features on the reticle. The different types of regions, features, or portions of features may include, for example, critical and non-critical regions, features, or portions of features as described in more detail herein. The designations may vary depending upon a design database generated from an integrated circuit design or layout.

Data representing a layout of a reticle and designations may have any form readable by a processor coupled to an inspection system or a process tool. For example, the data may include files or other readable data including one or more features and spatial positions within the reticle associated with the features. Each feature may also include one or more polygons or other shapes as described herein and a spatial position within the reticle may also be associated within each of the polygons or shapes. Therefore, the data can be used to fabricate a reticle.

The design database may be used to simulate a reference reticle image from the design database. The reference image may be determined by performing rigorous electromagnetic simulations on the design data so as to model the construction of a reticle model from such design data and model e-beam inspection of such reticle model to generate a reference image. For instance, the model simulates a reticle pattern by simulating a process for altering the design data patterns in a same way as such design patterns are altered to form the actual test reticle, e.g., corners of the design polygons are rounded, etc. The model also simulates a reference image that is generated from such simulated reticle pattern by modeling the particular inspection tool to generate a test image from the actual test reticle. More specifically, the model simulates how an e-beam is generated and impinged onto the simulated reticle and simulates how secondary electrons are then detected by the inspection tool's optics and sensors and simulates a reference image based on such detected secondary electrons.

A first set of tunable model parameters for simulating a reference image based on the design data may first be selected in operation 904. This model is also applied to the design data to generate a simulated reference reticle image in operation 904. Since defects typically represent a small percentage of the pixels in a reticle image, a majority of the modeled reference reticle image's pixels, except for defects, will match the test image when the tunable model parameters have been optimized. That is, when the model most closely simulates the process used to make the actual test reticle based on the design data (without defects) and the optics used to obtain a test image from such simulated reticle by the chosen inspection tool, the simulated reference image will also tend to closely match the test image. Thus, once the particular reticle process that was used to make the test reticle and the inspection tool that was used to generate the test image are understood and correctly modeled, an accurate reference image that most closely matches the test image (and how it was formed) can be simulated.

The tunable parameters of the model may take any suitable form for generating a corresponding reticle image. The tunable parameters may pertain to reticle writing characteristics, such as corner rounding amount, reticle material properties (e.g., composition and dimensions), pattern density dependent bias, etc., for constructing a reference reticle from the design data and inspection tool characteristics, such as incident and detection aperture settings, focus, aberration characteristics, voltage settings, pixel size, incident angle, etc., for modeling the same inspection tool that is being used to generate the test image from the test reticle. The inspection tool model is applied to the modeled reference reticle pattern to construct a reference image based on the design data. The modeled reference image corresponds to how a reticle that is constructed with the design data without any defects is imaged onto the inspection tool's sensor.

After the model is applied to the design data using each set of selected tunable parameters, it may then be determined whether an optimum match between the generated reference image and the corresponding test image has been reached in operation 906. For instance, each particular test patch image is compared to its corresponding reference patch image that was generated from the design database portion. Each test image and corresponding reference image may comprise a plurality of pixels having varying intensity values. Alternatively, the test and reference reticle portions may be represented by a plurality of intensity values for the plurality of xy positions in the reticle portion.

The tunable parameters will result in an optimum match after a particular number of iterations are performed through selecting different combinations of tuning parameter values. For instance, an optimum match may correspond to a set of parameters that result in a minimum difference between the test image and modeled reference image. An optimum match may be defined as the condition when a norm of difference of two images cannot be substantially reduced by changing adjustable parameters of the match. A suitable norm is the square root of the sum of squares of pixel by pixel differences of the two images or sum of squares of the differences.

In the illustrated embodiment, if the optimum match between the particular reference and test image has not been found, a next set of tunable parameters are selected for the model, which is applied to the design data to produce a new reference image in operation 904. A next set of parameter values are repeatedly selected in operation 904 until an optimum match between the reference and test image has been found.

Once an optimum match is found, the differences between the test image and the reference image may also be flagged and stored as a pattern defect image in operation 908. These defects may also be analyzed to determine whether such defects are within specifications as described further herein. For example, the defects can be analyzed to determine whether such defects represent real defects, fault defects, or noise.

A die-to-die or cell-to-cell inspection approach may also be utilized for the patterned EUV reticle.

Pattern orientation may also be factored into the process for detecting defects so as to separately consider such pattern differences due to orientation. For example, a design template may be used to specify particular pitch and orientation values for particular reticle portions. Alternatively, the design data patterns may be analyzed to locate particular patterns, such as one dimensional horizontal or vertical lines or spaces. For example, the inspection process may be performed separately for different reticle areas that have different pitch and orientations. In a specific implementation, vertical features are analyzed separately from horizontal features since the orientation of the features with respect to an angled incident beam will affect the resulting intensity differently, referred to as the "shadow effect" on the EUV scanner. As a result, even though certain patterns are intended to be the same on the final wafer regardless of their orientations, those patterns on the EUV reticle may have different sizes depending on their orientation with respect to the EUV scanner. Therefore, their simulation results can be different enough that horizontal and vertical features can be considered separately. That is, a reference image for the horizontal features can be obtained separately from a referenced image for the vertical features. These separate reference images can then be separately subtracted from the respective test image features. The final, difference images can then be combined or kept separate for correction of the photolithography process.

Referring back to FIG. 3, it may then be determined whether the reticle passes inspection in operation 306. If the reticle passes inspection, such reticle may be used for fabricating a wafer in operation 310. If the reticle fails inspection/measurement, the reticle may be discarded or repaired if possible in operation 308. For instance, certain defects can be cleaned or removed from the reticle. After repair, an inspection may be performed on the reticle at any time and the procedure 300 repeated. One such repair tool is Zeiss's CDC tool.

The resulting inspection results may be utilized in any suitable manner to determine whether the reticle should and can be repaired. For instance, an automated process may determine whether any pattern difference is above (or below) a predefined threshold. If a pattern difference is above (or below) the predefined threshold, the corresponding reticle portion may then be more carefully reviewed to determine whether the reticle is defective and can no longer be used (without reticle repair). For instance, a user may review the images of the defective areas, including the pattern defects and phase defect location images, to determine whether the corresponding reticle pattern areas are actually out of specification. Other analysis techniques to determine how the reticle defect would likely affect the wafer may be used.

Figure 11:
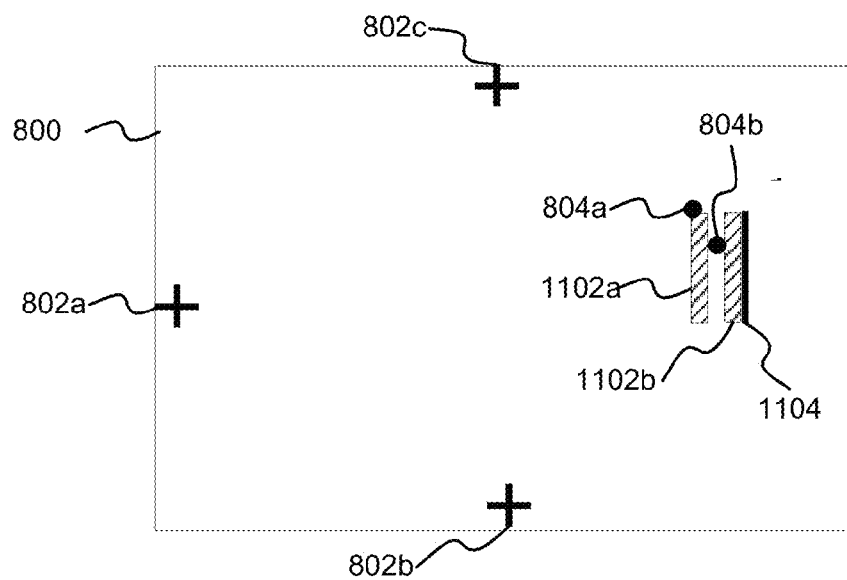
FIG. 11 is a simplified example of a phase defect image and a pattern defect image overlaid on a reticle pattern image in accordance with one example.
Figure 10:
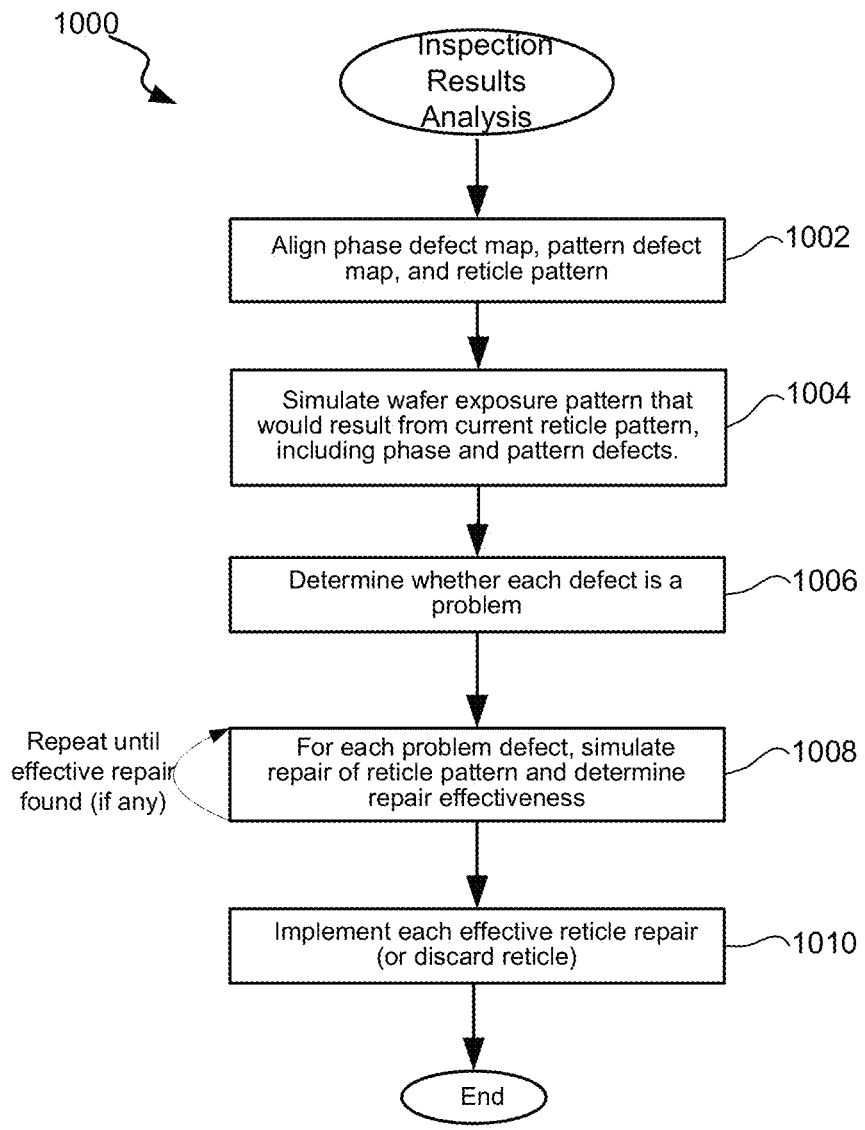
FIG. 10 is a flow chart illustrating an inspection results analysis procedure in accordance with a specific embodiment of the present invention.

FIG. 10 is a flow chart illustrating an inspection analysis procedure 1000 in accordance with a specific embodiment of the present invention. Initially, the phase defect map, pattern defect map, and reticle pattern may be aligned in operation 1002. For instance, the image of the phase defects and the image of the pattern defects are overlaid on the reticle pattern. FIG. 11 is a simplified example of a phase defect image and a pattern defect image overlaid on a reticle pattern image in accordance with one example. As shown, phase defects 804a and 804b and pattern defect 1104 are overlaid on the reticle image 800 with respect to reticle fiduciaries 802a, 802b, and 802c. The reticle image 800 includes reticle patterns 1102a and 1102b, which are also shown with respect to the reticle fiduciaries. Reticle pattern defect 1104 is shown as a widening of pattern line 1102b. For instance, the fiducials in the reticle pattern image, reticle defect image, and phase defect image may be aligned. Alternatively, previously stored coordinates for each defect may be used to map the defect images to a reticle pattern image. These stored coordinates all used the same reference, such as the reticle fiducials. Accordingly, the defect images can be accurately viewed in relation to the reticle pattern.

A wafer exposure pattern that would result from the current reticle pattern, which includes pattern defects, and phase defects, may also be simulated in operation 1004. For instance, PROLITH™ available from KLA-Tencor of Milpitas, Calif. may be used to simulate the exposure pattern of the wafer based on the current reticle pattern and phase defect information, such as defect location and size. For instance, the imaging of the reticle pattern onto a modeled photoresist layer using a particular photolithography tool is modeled so as to simulate an aerial image of the exposure pattern in a photoresist layer.

It may then be determined whether each defect (phase or pattern defect) is a problem in operation 1006. For example, differences between a simulated exposed pattern image, which can be based on the reticle and defect data, and a reference image may be determined. Differences that are above a predetermined threshold may be determined to be a problem that requires correcting or discarding the reticle.

Data in the design database representing a layout of the reticle may be used to generate a reference image. The reference image is a simulated image that would be formed on a specimen using a specific reticle and an exposure system having specific exposure conditions if the reticle pattern did not include any printable defects. In addition, the reference image substantially corresponds to an image of the reticle that would be formed on a wafer by an exposure system under a particular set of exposure conditions.

A design database may also include designations as described above. The designations may include, for example, flags or tags associated with different types of regions, features, or portions of features. The designations, however, may include any identification suitable to distinguish one type of region, feature, or portion of a feature from another type. Each region, feature, or portion of a feature on the reticle may be associated with a designation. Data in the design database representing a layout of the reticle may be separate from data in the design database representing the designations. In addition, different types of designations may be separated in the design database. For example, the design database may include a first set of data that includes designations for critical regions, features, or portions of features on the reticle and a second set of data that includes designations for non-critical regions, features, or portions of features on the reticle. Alternatively, different designations may be combined into a single set of data.

A designation may indicate to the inspection system an inspection method to be performed on a portion of the reticle associated with the designation. Such designations may also be used by an inspection system during inspection of a specimen, such as an integrated circuit fabricated using the reticle. In addition, or alternatively, a designation may indicate to a processor one or more functions such as a detection algorithm to be performed on data generated by an inspection system in a portion of the reticle associated with the designation. In this manner, different procedures can be used by the processor to detect defects on the reticle in different portions of the reticle. In a critical region, for example, a designation may indicate a more stringent threshold and/or a particular algorithm that may be used to detect defects. In some instances, the designations may be used to indicate only those regions of the reticle to be inspected or only those regions of the reticle not to be inspected. In addition, multiple designations may be associated with a portion of the reticle, and each designation may indicate a different parameter of the detection procedure. For example, a first and a second designation may be used to indicate a threshold and an algorithm, respectively, that are to be used for detecting defects in a single portion of a reticle. In addition, such designations may also be used by a process tool such as a pattern generator or a reticle writer to indicate to the process tool parameters of a process to be used to fabricate a reticle or an integrated circuit using the reticle.

Referring back to FIG. 10, a reticle repair may then be simulated and such reticle repair's effectiveness may be determined for each problem defect in operation 1008. If valid reticle repairs are found for all problem reticle defects, such reticle repairs may then be implemented in operation 1010. Otherwise, the reticle is discarded.

Combining optical inspection of the reticle blank with an e-beam inspection of the patterned reticle gives a complete picture of EUV reticle quality. The combined inspection results from the optical and e-beam inspection tools can also be used to simulate the effects of the detected phase defects and of the pattern defects on the lithographically printed integrated circuit and to determine whether the defect needs to be repaired or compensated.

Inspection System Examples

Figure 12:
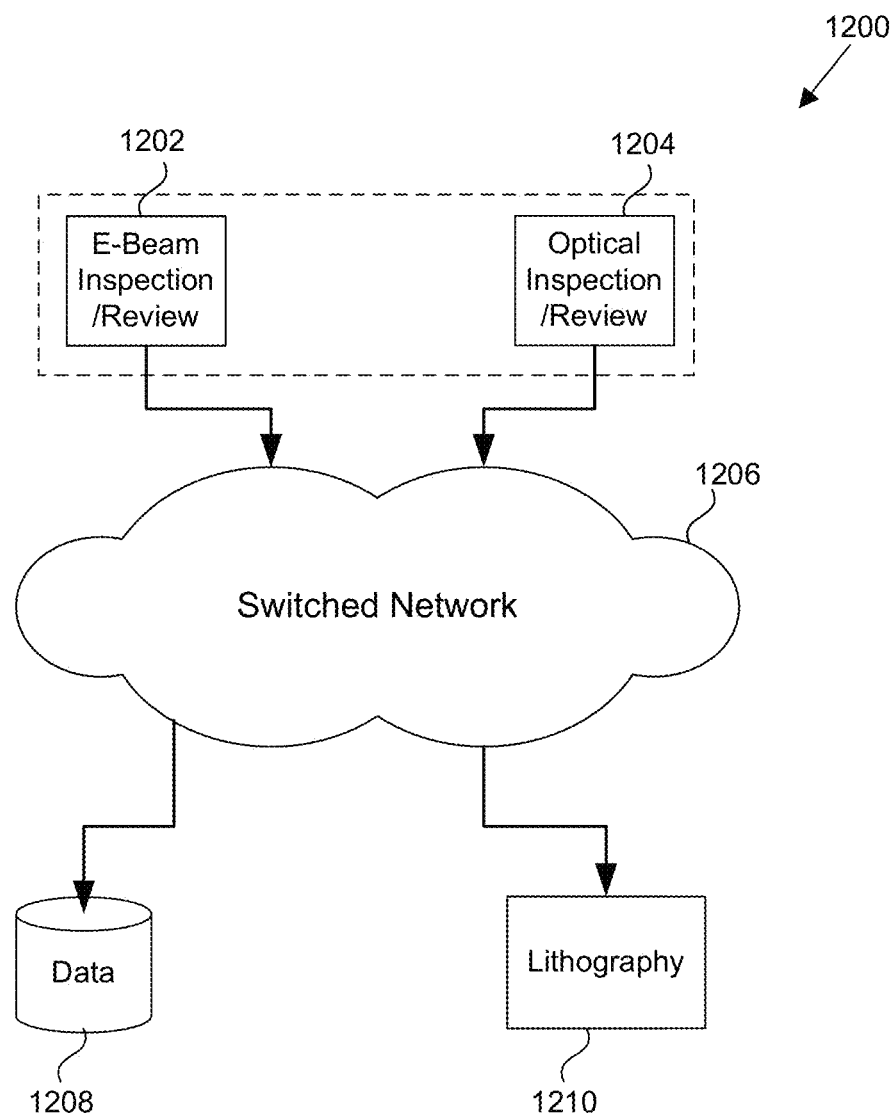
FIG. 12 is a diagrammatic representation of an example inspection and lithography system in which techniques of the present invention may be implemented.

Techniques of the present invention may be implemented in any suitable combination of hardware and/or software system. FIG. 12 is a diagrammatic representation of an example inspection and lithography system 1200 in which techniques of the present invention may be implemented. As shown, the system 1200 includes an optical inspection tool 1204 for inspecting a blank reticle (or other specimens) for defects, an e-beam inspection tool 1202 for detecting pattern defects on a patterned EUV reticle and obtaining high-resolution images of defects, one or more lithography systems 1210 for fabricating and using an EUV reticle, a network (e.g., switched network 1206) for allowing communication between the inspection lithographic system components, and an optional mass storage device 1208. Any of the inspection or lithography systems may also include one or more inspection/lithography control and/or review stations for setting up the inspection and lithography systems and reviewing the defect data, images, and maps. Each device of the inspection and lithography system typically may include one or more microprocessor integrated circuits and may also contain interface and/or memory integrated circuits and may additionally be coupled to one or more shared and/or global memory devices for storing the setup recipes and inspection results.

The various components and tools may be implemented as separate devices or implemented in an integrated cluster system. The system 1200 may also include a data distribution system for distributing image or detection data via network 1206, as part of or separate from each inspection system. The data distribution system may be associated with one or more memory devices, such as RAM buffers, for holding at least a portion of the received data. Preferably, the total memory is large enough to hold an entire swath of data. For example, one gigabyte of memory works well for a swath that is 1 million by 1000 pixels or points.

Each component of the system 1200 may comprise a specially configured computer system that includes program instructions/computer code for performing various operations described herein that can be stored on a computer readable media. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

The optical inspection apparatus 1204 may be suitable for inspecting semiconductor devices or wafers and optical reticles, as well as EUV reticles or masks. One suitable inspection tool is the Teron™ reticle inspection tool available from KLA-Tencor of Milpitas, Calif. Other types of samples which may be inspected or imaged using the inspection apparatus of the present invention include any surface, such as a flat panel display.

An optical inspection tool may include at least one light source for generating an incident light beam, illumination optics for directing the incident beam onto a sample, collection optics for directing an output beam that is emitted from the sample in response to the incident beam, a sensor for detecting the output beam and generating an image or signal for the output beam, and a controller for controlling the components of the inspection tool and facilitating the inspection techniques as described further herein.

In the following exemplary inspection systems, the incident beam may be in any suitable form of light. Additionally, any suitable lens arrangement may be used to direct the incident beam towards the sample and direct the output beam emanating from the sample towards a detector. The output beam may be reflected or scattered from the sample or transmitted through the sample, depending upon the particular inspection or metrology application. For EUV reticle inspection, the output beam is reflected from the sample. Likewise, any suitable detector type or number of detection elements may be used to receive the output beam and provide an image or a signal based on the characteristics (e.g., intensity) of the received output beam.

The inspection tool may be generally operable to convert such detected light into detected signals corresponding to intensity values. The detected signals may take the form of an electromagnetic waveform having amplitude values that correspond to different intensity values at different locations of the reticle. The detected signals may also take the form of a simple list of intensity values and associated reticle point coordinates. The detected signals may also take the form of an image having different intensity values corresponding to different positions or scan points on the reticle. An intensity image may be generated after all the positions of the reticle are scanned and converted into detected signals, or potions of an intensity image may be generated as each reticle portion is scanned with the final intensity image being complete after the entire reticle is scanned.

In certain inspection applications, the incident light or detected light may be passed through any suitable spatial aperture to produce any incident or detected light profile at any suitable incident angles. By way of examples, programmable illumination or detection apertures may be utilized to produce a particular beam profile, such as dipole, quadrapole, quasar, annulus, etc. In a specific example, pixelated illumination techniques may be implemented. Programmable illuminations and special apertures can serve the purpose of enhancing feature contrast for certain patterns on the reticle.

Figure 13:
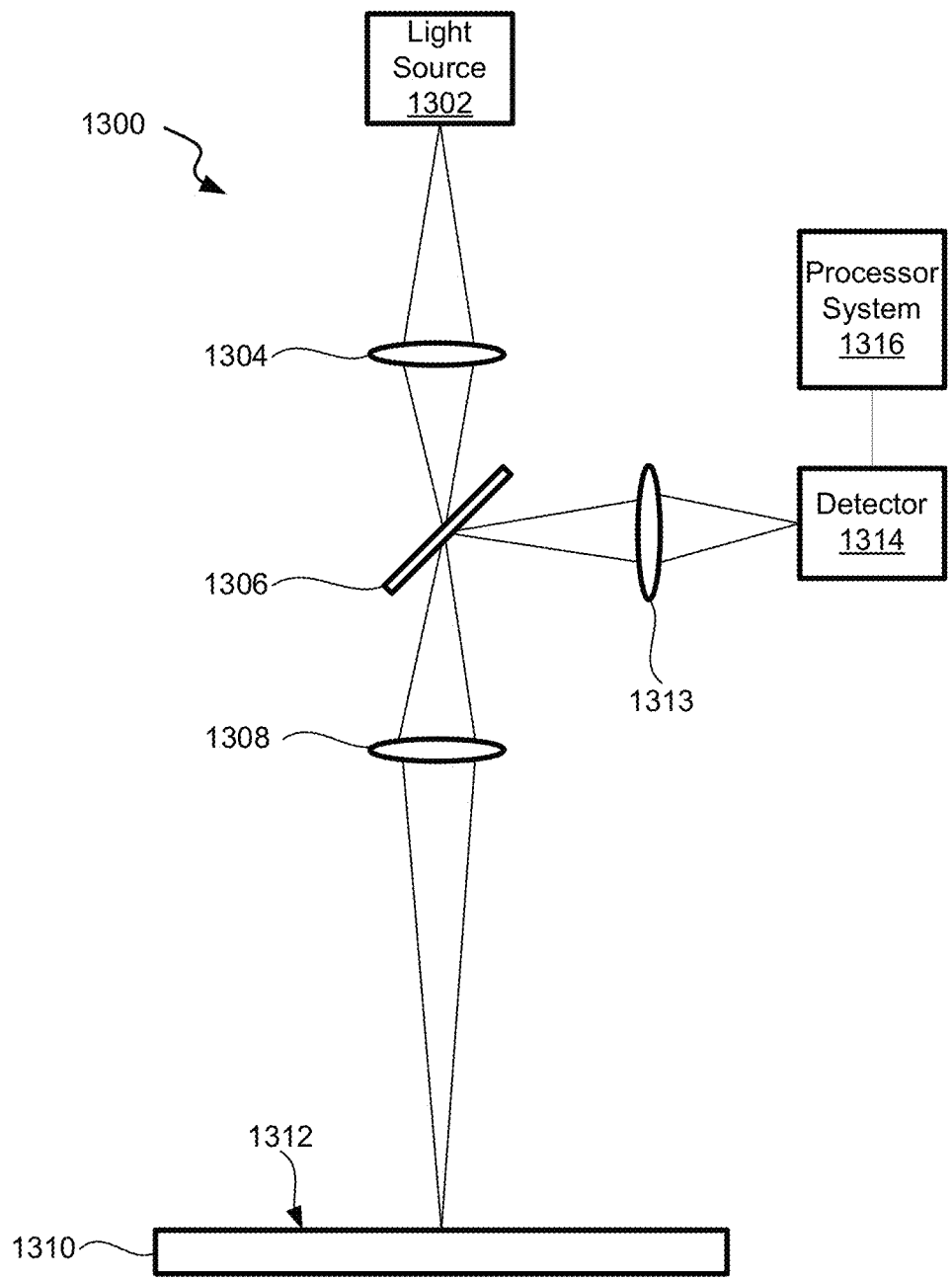
FIG. 13 is a diagrammatic representation of some elements of an optical inspection tool in which techniques of the present invention may be implemented.

FIG. 13 is a diagrammatic representation of some elements of an optical inspection tool 1300 in which techniques of the present invention may be implemented. The optical inspection tool 1300 includes a light source 1302 that is suitable for inspection of an EUV reticle. One example of a light source is a quasi-continuous wave laser. In certain embodiments, a light source may generally provide high pulse repetition rate, low-noise, high power, stability, reliability, and extendibility. It is noted that while an EUV scanner operates at 13.5 nm wavelength, an inspection tool for an EUV reticle does not have to operate at the same wavelength. A Teron™ system from KLA-Tencor operating at 193 nm has been proven to be able to inspect EUV reticles.

A light source may include a beam steering device for precise beam positioning and a beam conditioning device, which can be used to provide light level control, speckle noise reduction, and high beam uniformity. Beam steering and/or beam conditioning devices may be separate physical devices from, for example, a laser.

An inspection system includes a collection of optical elements for focusing an illuminating light beam onto the inspected surface 1312. For brevity, FIG. 13 illustrates only a condenser lens 1304, an imaging lens 1308, a detector lens 1313, and a beam splitter 1306. However, one skilled in the art would understand that an inspection system can include other optical elements needed to achieve specific inspection functions. The imaging lens can be adjusted to different sizes of pixels, e.g., less than about 100 nm for each pixel or, more particularly, less than about 75 nm or even less than 60 nm.

The sample 1310 may also be placed on a stage (not labeled) of the inspection system 1300, and the inspection system 1300 may also include a positioning mechanism for moving the stage (and sample) relative to the incident beam. By way of examples, one or more motor mechanisms may each be formed from a screw drive and stepper motor, linear drive with feedback position, or band actuator and stepper motor.

After the incident beam(s) impinge on the sample 1310, the light may then be reflected and scattered from the sample 1310 in the form of "output light" or an "output beam" (or multiple output beams). The inspection system also includes any suitable lens arrangements for directing the output light towards one or more detectors. As shown, a reflected beam can be received by a detector 1314 via lens 1308, splitter 1306, and lens 1313. In certain embodiments, the detector 1314 is a time delay integration (TDI) detector. A typical TDI detector accumulates multiple exposures of the same area of the inspected surface, effectively increasing the integration time available to collect incident light. The object motion is synchronized with the exposures to ensure a crisp image. In general, a detector may include transducers, collectors, charge-coupled devices (CCDs) or other types of radiation sensors.

FIG. 13 shows an example where an illuminating light beam is directed towards the sample surface 1312 at a substantially normal angle with respect to the inspected surface. In other embodiments, an illuminating light beam can be directed at an oblique angle, which allows separation of the illuminating and reflected beams. In these embodiments, an attenuator may be positioned on the reflected beam path in order to attenuate a zero order component of the reflected light beam prior to reaching a detector. Furthermore, an imaging aperture may be positioned on the reflected beam path to shift the phase of the zero order component of the reflected light beam. An illumination aperture may also be positioned on the illumination path to achieve various illumination profiles.

A detector is typically coupled with a processor system 1316 or, more generally, to a signal processing device, which may include an analog-to-digital converter configured to convert analog signals from the detector 1314 to digital signals for processing. The processor system 1316 may be configured to analyze intensity, phase, and/or other characteristics of one or more reflected beams. The processor system 1316 may be configured (e.g., with programming instructions) to provide a user interface (e.g., a computer screen) for displaying a resultant test image and other inspection characteristics. The processor system 1316 may also include one or more input devices (e.g., a keyboard, mouse, joystick) for providing input. The processor system 1316 may also be coupled with the stage for controlling, for example, a sample position (e.g., focusing and scanning) and other inspection parameters and configurations of the inspection system elements. In certain embodiments, the processor system 1316 is configured to carry out inspection techniques detailed above.

Any suitable e-beam tool may be used to efficiently detect pattern defects and obtain high-resolution images at locations of the phase defect detected by an optical tool. In one embodiment, a charged particle tool, such an electron beam tool, having multiple beam columns is utilized. In one example, the e-beam tool has more than 25 beam columns for scanning simultaneously across the reticle. Several suitable multiple column e-beam systems are described further in International PCT application, having Publication No. 2013/003371, filed 26 Jun. 2012, and U.S. patent application, having Publication No. 2013/0001418, filed 25 Jun. 2012. These applications are incorporated herein by reference in their entirety. These multiple columns can be simultaneously scanned across the entire reticle in 4-5 hours, as compared to current single-beam systems that require 100 hours or more. However, single column e-beam systems can also be used.

In specific implementations, an e-beam inspection tool may generally include a multiple column head having a 10×10 array of columns (100) or a 14×14 array of columns (196). Thus, an inspection of a 100×100 mm2 reticle area can be 4 hours or less using such high number of columns. The e-beam tool may also include a plurality of such multiple column heads to achieve even faster inspection times.

In a specific multiple-column e-beam inspection system, multiple lensing fields may be produced by immersing a magnetic block of material having an array of bores into the large-scale magnetic field. The locations of the bores define the locations of the columns. The large-scale B-field decays as it enters the bores from either end, thereby producing two lenses—one at the end towards the source, and one at the end towards the target substrate. In addition, the B-field effectively contains the secondary electrons emitted from the sample under examination, allowing them to be swept back up each of the columns so as to be detected. Signal contamination due to electron spillage to adjacent columns is negligible.

The electrostatic elements in each column provide the capability to raster the electron beam with varying landing energies and extraction fields for various inspection use cases. The scanning among the columns may be synchronous and may be performed along a single direction, normal to the stage travel direction, so as to cover the wafer area in swaths.

Figure 14:
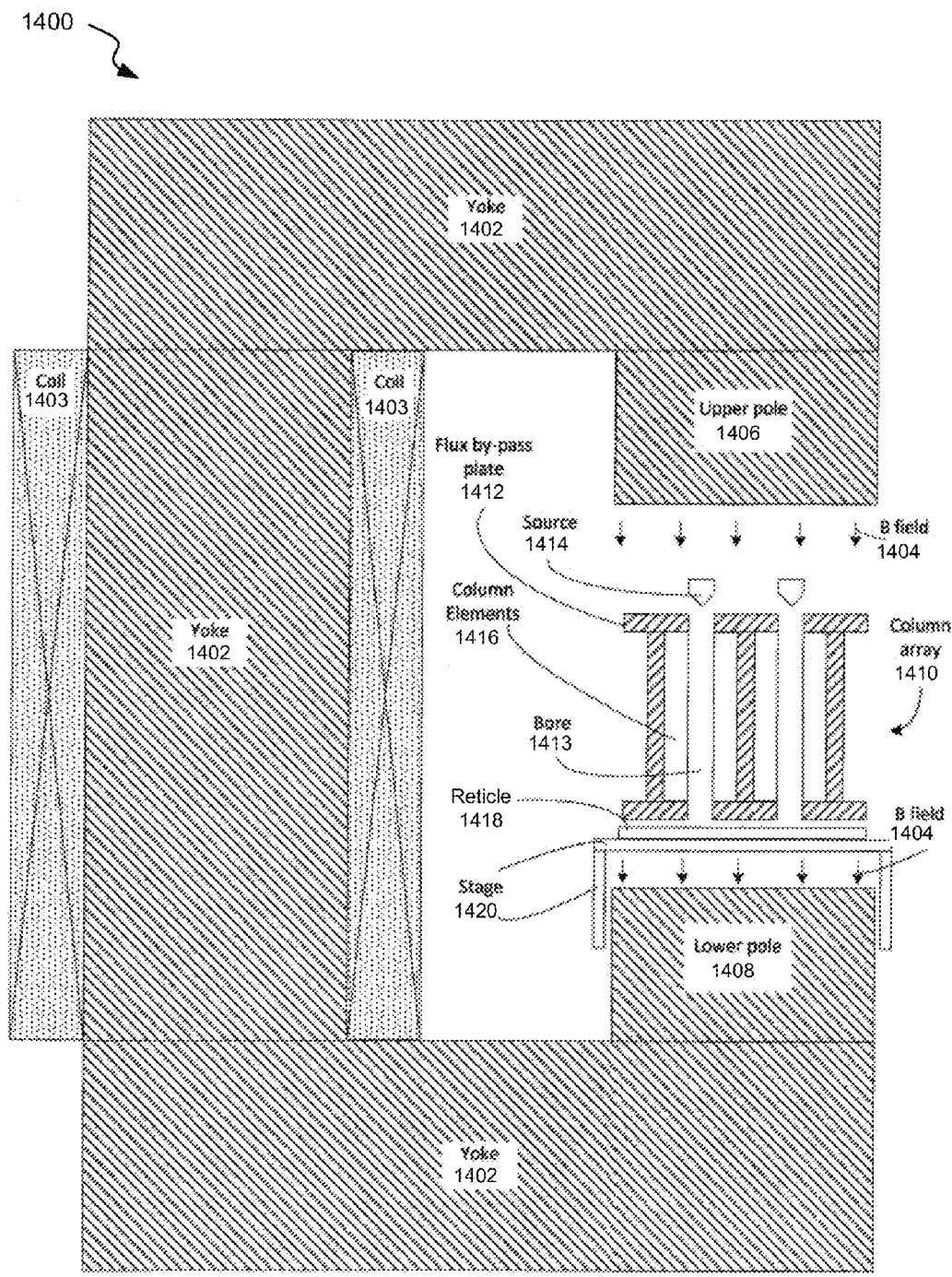
FIG. 14 is a cross-sectional diagram of a multiple-column electron beam apparatus in which certain techniques of the present invention may be implemented.

FIG. 14 is a cross-sectional diagram of a multiple-column electron beam apparatus 1400 in which certain techniques of the present invention may be implemented. The apparatus 1400 includes an electromagnet for the large-scale (global) magnetic circuit. The electromagnet may include a conductive coil 1403 wound around a magnetic yoke 1402 and may be configured to produce a large-scale, magnetic field (B field) 1404 in a region between an upper magnetic pole piece (pole) 1406 and a lower magnetic pole piece (pole) 1408. Note that one position of the conductive coil 1403 about the yoke 1402 is depicted in the embodiment shown in FIG. 14. The conductive coil 1403 may be arranged at other positions in alternate embodiments.

The large-scale B field 1404 may be configured to be homogeneous (uniform) in the region between the upper and lower poles (1406 and 1408) without the presence of the multiple-column array 1410. The multiple-column array 1410 may be arranged within the region of the large-scale B field 1404.

The multiple-column array 1410 may be formed using a magnetic flux by-pass plate 1412 with multiple bores 1413 that perturb the large-scale B field 1404 so as to produce lensing fields for each of the columns in the array 1410. The lensing fields are formed at both of the ends of each bore 1413 due to the decay of the large-scale B field 1404 as it enters each end of each bore 1413. The flux by-pass plate 1412 may be made of magnetic steel, for example.

The flux by-pass plate 1412 may be a single monolithic plate. Alternatively, the flux by-pass plate 1412 may be formed using two plates (upper and lower) to allow applying different voltages to the upper and lower portions. As another alternative, the flux by-pass plate 1412 may be divided in the x-y (horizontal) dimensions to allow adjusting the voltage on each individual bore 1413.

Further components may be included so as to use each bore 1413 as a micro-column for the generation and focusing of an individual electron beam. These components generally include an electron source 1414 and multiple column elements 1416 arranged to be adjacent to each bore 1413. An exemplary implementation of these components is described below in relation to the embodiment of an individual micro-column depicted in FIG. 15.

The column array 1410 is configured to individually focus the multiple electron beams onto the surface of a reticle 1418 (or wafer or other substrate) positioned below the bottom end of the bores 1413. The column array 1410 may include a two-dimensional array of electron beam columns, where each column may be formed by arranging appropriate components in and about a bore 1413.

The target reticle (or other manufactured substrate, such as a wafer) 1418 may be held by a movable stage 1420. In FIG. 14, the stage 1420 may be configured to move the reticle 1418 under the column array 1410 in the direction perpendicular to the plane of the page. In an exemplary implementation, the stage 1420 may be configured to use cross-roller bearings to be movably supported above the lower yoke 1408, and the height of the stage 1420 above the lower yoke 1408 may be adjustable.

Figure 15:
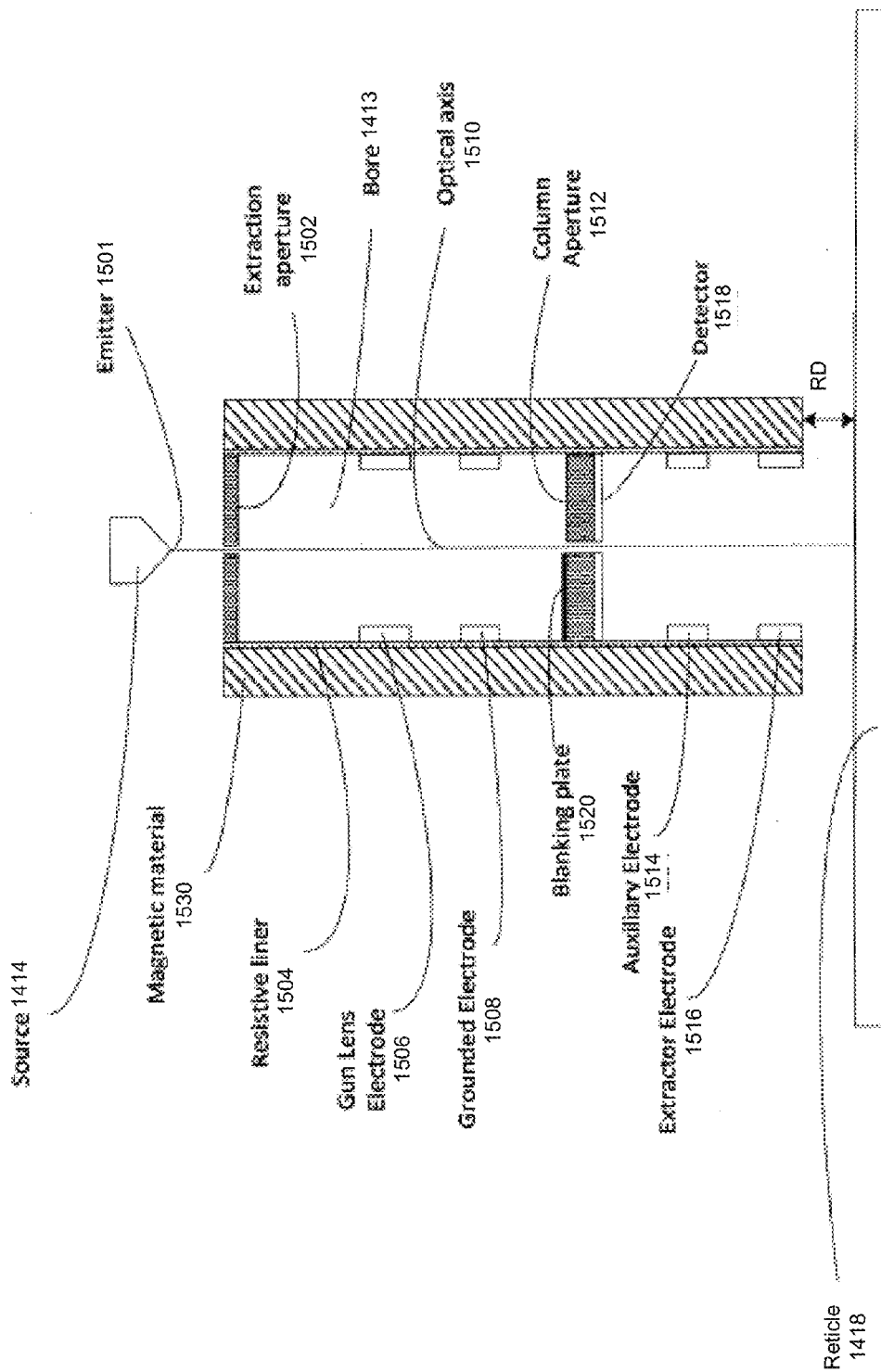
FIG. 15 is an exemplary microcolumn of the electron beam apparatus of FIG. 14.

FIG. 15 is a cross-sectional diagram of a single micro-column formed within magnetic material 1530 in accordance with an embodiment of the invention. The magnetic material 1530 may be that of a flux by-pass plate 1412 per the embodiment of FIG. 14. The micro-column may be configured to generate an electron beam that travels down the bore 1413 along the optical axis 1510 of the column. As shown, the components of the micro-column may include an emitter 1501, an extraction aperture 1502, a resistive liner 1504, a gun lens electrode 1506, a grounded electrode 1508, a column aperture 1512, one or more auxiliary electrodes 1514, and an extractor electrode 1516.

In one embodiment, each bore 1413 formed through magnetic material may be cylindrical and may be 9.5 mm in length and 0.5 mm in diameter. Other bore dimensions may be implemented in other embodiments. Note that the bore 1413 need not be symmetric in that it may have different entrance and exit hole sizes.

The electron source 1414 may have an emitter 1501, to which is applied a highly negative voltage Vemitter. The extraction aperture 1502 may be formed from an electrode with an opening therein. The electrode may have a voltage Vextractor applied thereto that is positive relative to Vemitter so as to extract electrons from the emitter 1501. The extractor voltage may be set to provide the desired current and angular intensity of extracted electrons.

The resistive liner 1504 may be arranged around the bore 1413, and such resistive liner may be used to shield the field of the electrodes of the bore from the potential on the magnetic material 1530 of the bore.

The voltage on the magnetic material 1530 of each bore may be set to a potential determined by the mode of operation. In one implementation, the voltage on the magnetic material 1530 of each bore may be set so as to act as a suppressor for charge control at the target reticle (or other manufactured substrate) 1418.

The gun lens electrode 1506 may be comprised of one or multiple electrodes arranged around a portion of the bore 1413 in the upper column. The gun lens electrode 1506 of each bore may have a voltage Vgun applied to it so as to condense the electrons into an electron beam.

The grounded electrode 1508 may be arranged around a portion of the bore 1413 beneath the gun lens electrode 1506, and such grounded electrode is conductively connected to an electrical ground of the apparatus. As such, the grounded electrode of each bore is at a potential that is |Vemitter| higher (more positive) than the emitter 1501 of the bore. Hence, the electrons of the electron beam traveling down the optical axis 1510 of the micro-column will have an energy of approximately e|Vemitter| as it passes by the grounded electrode 1508. The grounded electrode 1508 may also function as a centering deflector which acts to center the electron beam through the column aperture 1512.

For example, Vemitter may be negative 3 kilovolts (3 kV) such that the beam energy e|Vemitter| would be three kilo electron volts (3 keV). Other beam energies may be generated by applying different voltages to the emitter. The gun lens electrode 1506 and the grounded electrode 1508 may be spaced apart in order to maintain inter-electrode fields between the electrodes (1506 and 1508) below a threshold field strength. In one embodiment, for example, if the potential difference between the electrodes (1506 and 1508) is approximately 3 kV, then in order to maintain the inter-electrode fields below a threshold field strength of 4 kV/mm, the electrodes (1506 and 1508) would be spaced apart by at least 0.75 mm since 3 kV/0.75 mm=4 kV/mm. In other embodiments, the inter-electrode fields may be maintained below other threshold field strengths by appropriate electrode spacing.

The column aperture 1512 may be arranged around the optical axis 1510 below the grounded electrode 1508. The column aperture 1512 separates the upper column which includes components relating to the electron gun from the lower column which includes components relating to beam deflection and the magnetic objective lens.

The auxiliary electrode(s) 1514 may comprise one or multiple electrodes arranged around a portion of the bore 1413 beneath the column aperture 1512. In one implementation, two auxiliary electrodes 1514 may be used in each bore 1413. The resistive liner 1504 may be used to shield the field of the auxiliary electrode(s) 1514 from the potential on the flux by-pass plate 1412. The auxiliary electrode(s) 1514 may function as a first electrostatic component to which an appropriate voltage may be applied to reduce aberrations in the electron beam.

The extractor electrode 1516 may comprise one or multiple electrodes arranged around a portion of the bore 1413 beneath the auxiliary electrode(s) 1514. The resistive liner 1504 may be used to shield the field of the extractor electrode 1516 from the potential on the pole piece of the central yoke 1412. The extractor electrode 1516 may function as a second electrostatic component to which an appropriate voltage may be applied to reduce aberrations in the electron beam. In one embodiment, the auxiliary electrode(s) 1514 and the extractor electrode 1516 may be spaced apart so as to maintain an inter-electrode field strength below the threshold field strength described above.

The manufactured substrate 1418 may be arranged to be a distance RD below the magnetic material 1530 which surrounds the bottom end of the bore 1413 that defines the micro-column. In one embodiment, RD is sufficiently long so as maintain the field strength between the magnetic material 1530 and the manufactured substrate 1418 below the threshold field strength described above.

As described above in relation to FIG. 14, the magnetic material 1530 and the manufactured substrate 1418 are immersed in the large-scale B field 1404. The presence of the magnetic material 1530 which surrounds the bottom end of the bore 1413 within the large-scale B field 1404 causes the large-scale B field 1414 to effectively decay as it approaches the bottom end of the bore 1413. The resultant field effectively forms an objective magnetic lens which focuses the electron beam onto the surface of the reticle 1418.

In one embodiment, the micro-column may be configured for electron beam imaging. In this case, a detector 1518 may be provided in the microcolumn. The detector 1518 may be implemented as a PIN diode detector and may be positioned beneath the column aperture 1512. In this embodiment, the resultant B field, which forms the objective magnetic lens, also acts to contain secondary electrons emitted from the reticle 1418. This arrangement allows the secondary electrons to pass back up through the bore 1413 of the micro-column towards the detector 1518.

It should be noted that the above description and drawings are not to be construed as a limitation on the specific components of the system and that the system may be embodied in many other forms. For example, it is contemplated that the inspection or measurement tool may have any suitable features from any number of known imaging or metrology tools arranged for detecting defects and/or resolving the critical aspects of features of a reticle or wafer. By way of example, an inspection or measurement tool may be adapted for bright field imaging microscopy, dark field imaging microscopy, full sky imaging microscopy, phase contrast microscopy, polarization contrast microscopy, and coherence probe microscopy. It is also contemplated that single and multiple image methods may be used in order to capture images of the target. These methods include, for example, single grab, double grab, single grab coherence probe microscopy (CPM) and double grab CPM methods. Non-imaging optical methods, such as scatterometry, may also be contemplated as forming part of the inspection or metrology apparatus.

Although the foregoing invention has been described in some detail for purposes of clarity of understanding, it will be apparent that certain changes and modifications may be practiced within the scope of the appended claims. It should be noted that there are many alternative ways of implementing the processes, systems, and apparatus of the present invention. Accordingly, the present embodiments are to be considered as illustrative and not restrictive, and the invention is not to be limited to the details given herein.

What is claimed is:

1. A method of inspecting an extreme ultraviolet (EUV) reticle, the method comprising:
   using an inspection tool for detecting electromagnetic waveforms to inspect the EUV reticle for phase defects and obtain a phase defect map for the EUV reticle before a pattern is formed on the EUV reticle, wherein the phase defect map identifies a position of each phase defect on the EUV reticle;
   after the pattern is formed on the EUV reticle, using a charged particle tool to inspect the EUV reticle for pattern defects and obtain a pattern defect map for the EUV reticle, as well as to obtain an image of each reticle portion that is proximate to each position of each phase defect as identified in the phase defect map, wherein the pattern defect map identifies a position of each pattern defect on the EUV reticle;
   prior to forming the pattern on the EUV reticle, analyzing a position of each of a plurality of phase defects as identified by the phase defect map relative to a design pattern, which can be used to form the pattern on the EUV reticle, to determine whether such phase defect is predicted to cause a problem in a device that is fabricated with the EUV reticle after it is patterned with the design pattern and whether such problem can be mitigated by altering the design pattern of the EUV reticle; and
   if one or more phase defects are predicted to cause a problem that can be mitigated, altering the design pattern and using the altered design pattern to form the pattern on the EUV reticle so as to mitigate the problem.

2. The method as recited in claim 1, further comprising:
   prior to using the EUV reticle in a photolithography process, simulating an exposure pattern that would result from each pattern defect and phase defect on the EUV reticle based on the phase defect map and the pattern defect map;
   prior to using the EUV reticle in a photolithography process, analyzing the simulated exposure pattern to determine whether one or more pattern or phase defects are predicted to cause a problem in a device that is fabricated with the EUV reticle and whether such problem can be mitigated by altering the pattern of the EUV reticle, wherein simulating and analyzing the simulated exposure pattern are performed without use of a design database that was utilized to fabricate the EUV reticle; and
   if one or more pattern or phase defects are predicted to cause a problem that can be mitigated, altering the pattern of the EUV reticle so as to mitigate the problem.

3. The method as recited in claim 1, wherein the position of each phase defect is referenced with respect to a first stage coordinate system of the inspection tool and the position of each pattern defect is referenced with respect to a second stage coordinate system of the charged particle inspection tool.

4. The method as recited in claim 3, wherein both the first and second stage coordinate systems are based on a plurality of fiducial marks of the EUV reticle.

5. The method as recited in claim 1, wherein the pattern defect map is obtained by compensating for design differences between reticle portions that are designed to result in identical exposed patterns when using the EUV reticle in a photolithography process and are designed to compensate for at least a flare effect of the photolithography process.

6. The method as recited in claim 1, wherein the pattern defect map is obtained via multiple beams of the charged particle tool scanning simultaneously across the EUV reticle.

7. The method as recited in claim 6, wherein the multiple beams have a number greater than 25.

8. A system for inspecting a reticle, comprising:
   an inspection tool for detecting electromagnetic waveforms and configured to inspect a EUV reticle, which is unpatterned, and generate a phase defect map that specifies a plurality of phase defects and their associated positions on the EUV reticle; and
   a charged particle inspection tool configured to inspect the EUV reticle after a reticle pattern is formed on such EUV reticle and obtain a pattern defect map that specifies a plurality of pattern defects and their associated positions on the EUV reticle, wherein the charged particle inspection tool is further configured to obtain an image at each phase defect's associated position on the EUV reticle after a reticle pattern is formed on such EUV reticle,
   an analyzer configured for analyzing the phase defect map and the pattern defect map to predict whether one or more pattern or phase defects will cause a problem in a device that is fabricated with the EUV reticle.

9. The system as recited in claim 8, wherein the charged particle inspection tool, the inspection tool, and analyzer are in the form of an integrated cluster system.

10. The system as recited in claim 8, wherein the charged particle inspection tool is configured to form a plurality of beam columns, the system further comprising a reticle repair tool for repairing the EUV reticle if one or more pattern or phase defects are predicted to cause a problem that can be mitigated.

11. The system as recited in claim 10, wherein the beam columns are formed by using a magnetic flux by-pass plate with multiple bores that perturb a large-scale B field so as to produce lensing fields for each of the beam columns, wherein the charged particle tool includes the magnetic flux by-pass plate with multiple bores.

12. The system as recited in claim 10, wherein the charged particle inspection tool is configured to form more than 25 beam columns.

13. The system as recited in claim 8, wherein the position of each phase defect is referenced with respect to a first stage coordinate system of the inspection tool and the position of each pattern defect is referenced with respect to a second stage coordinate system of the charged particle inspection tool and wherein both the first and second stage coordinate systems are based on a plurality of fiducial marks of the EUV reticle.

14. The system of claim 8, wherein the analyzer forms part of the charged particle inspection tool and/or the inspection tool for detecting electromagnetic waveforms.

15. An apparatus for reviewing inspection results for a EUV reticle, comprising:
a display for displaying images; and
a controller that is configured to perform the following operations:
receiving a phase defect map for a EUV reticle that was obtained using an electromagnetic waveform inspection tool before a pattern is formed on the EUV reticle, wherein the phase defect map identifies a position of each phase defect on the EUV reticle;
on the display, displaying an image of each reticle portion that is proximate to each position of each phase defect as identified in the phase defect map, wherein each image for each phase defect is obtained by a charged particle inspection tool after the pattern is formed on the EUV reticle;
on the display, displaying a pattern defect map for the EUV reticle that was obtained using the charged particle inspection tool after the pattern is formed on the EUV reticle, wherein the pattern defect map identifies a position of each pattern defect on the EUV reticle;
analyzing the phase defect map and the pattern defect map to predict whether one or more pattern or phase defects will cause a problem in a device that is fabricated with the EUV reticle.

16. The apparatus as recited in claim 15, wherein the position of each phase defect is referenced with respect to a first stage coordinate system of the inspection tool and the position of each pattern defect is referenced with respect to a second stage coordinate system of the charged particle inspection tool, wherein both the first and second stage coordinate systems are based on a plurality of fiducial marks of the EUV reticle.

17. The apparatus as recited in claim 15, wherein the pattern defect map is obtained by compensating for design differences between reticle portions that are designed to result in identical exposed patterns when using the EUV reticle in a photolithography process and are designed to compensate for at least a flare effect of the photolithography process.

18. The apparatus as recited in claim 15, wherein the apparatus is in the form of the charged particle inspection tool and is configured to form multiple columns for scanning simultaneously across the EUV reticle.

19. The apparatus of claim 18, wherein the multiple columns have a number greater than 25.

20. The apparatus as recited in claim 19, wherein the multiple columns are formed by using a magnetic flux by-pass plate with multiple bores that perturb a large-scale B field so as to produce lensing fields for each of the beam columns, wherein the charged particle tool includes the magnetic flux by-pass plate with multiple bores.

* * * * *